US00RE44851E

(19) United States
(12) Reissued Patent
Taylor

(10) Patent Number: US RE44,851 E
(45) Date of Reissued Patent: *Apr. 22, 2014

(54) FLEXIBLE MATERIAL

(75) Inventor: David Stirling Taylor, Accrington (GB)

(73) Assignee: Stirling Mouldings Limited (GB)

( * ) Notice: This patent is subject to a terminal disclaimer.

(21) Appl. No.: 13/485,167

(22) Filed: May 31, 2012

Related U.S. Patent Documents

Reissue of:
(64) Patent No.: 6,743,325
Issued: Jun. 1, 2004
Appl. No.: 10/030,782
PCT Filed: Jul. 13, 2000
PCT No.: PCT/GB00/02687
§ 371 (c)(1),
(2), (4) Date: Apr. 23, 2002
PCT Pub. No.: WO01/03530
PCT Pub. Date: Jan. 18, 2001

U.S. Applications:
(63) Continuation of application No. 13/107,688, filed on May 13, 2011, now Pat. No. Re. 43,441, which is a continuation of application No. 12/642,522, filed on Dec. 18, 2009, now Pat. No. Re. 42,689, which is a continuation of application No. 11/269,919, filed on Nov. 8, 2005, now Pat. No. Re. 41,346.

(30) Foreign Application Priority Data

Jul. 13, 1999 (GB) ..... 9916291.9
Sep. 16, 1999 (GB) ..... 9921804.2

(51) Int. Cl.
*B32B 38/04* (2006.01)

(52) U.S. Cl.
USPC ..... 156/265; 156/269; 156/271; 156/299; 156/300; 156/301; 156/512; 156/560; 156/308.2

(58) Field of Classification Search
USPC ..... 156/251, 256, 259, 264, 265, 271, 299, 156/300, 301, 308.2, 512, 515, 560, 561, 156/583.1; 2/2.15, 2.16, 20, 22, 23, 24, 2/455, 456; 428/141, 304.4
See application file for complete search history.

(56) References Cited

U.S. PATENT DOCUMENTS 2,751,609 A 6/1956 Oesterling et al.
2,785,739 A 3/1957 McGregor, Jr. et al.

(Continued)

FOREIGN PATENT DOCUMENTS

DE 3641609 C1 2/1988
DE 9102039 U 5/1991

(Continued)

OTHER PUBLICATIONS

Defendant Nike USA Inc.'s Answer And Counterclaims To Plaintiffs' Fourth Amended Complaint, filed Jul. 2, 2012, *McDavid Knee Guard, Inc.* v. *Nike USA, Inc.*, Civil No. 08-CV-6584 (Doc. No. 505), 14 pages.

(Continued)

*Primary Examiner* — Mark A Osele
(74) *Attorney, Agent, or Firm* — Fitch, Even, Tabin & Flannery, LLP

(57) ABSTRACT

A flexible material includes a plurality of separate resilient elements joined to a flexible, resiliently stretchable substrate. Such a material is suitable for providing protective war for human and animal bodies. Preferably, the elements includes a foam material such as a closed cell polyethylene foam and the substrate includes a knitted fabric. In an advantageous embodiment, a second flexible substrate is bonded over the elements to sandwich them between the two layers of substrate.

29 Claims, 3 Drawing Sheets

(56) References Cited

U.S. PATENT DOCUMENTS

| | | | |
|---|---|---|---|
| 3,020,186 | A | 2/1962 | Lawrence |
| 3,137,746 | A | 6/1964 | Seymour et al. |
| 3,285,768 | A | 11/1966 | Habib |
| 3,285,800 | A | 11/1966 | Bartell et al. |
| 3,293,671 | A | 12/1966 | Griffin |
| 3,305,423 | A | 2/1967 | Masson |
| 3,404,406 | A | 10/1968 | Balliet |
| 3,441,638 | A | 4/1969 | Patchell et al. |
| 3,465,364 | A | 9/1969 | Edelson |
| 3,471,865 | A | 10/1969 | Molitoris |
| 3,512,190 | A | 5/1970 | Buff |
| 3,515,625 | A | 6/1970 | Sedlak et al. |
| 3,679,263 | A | 7/1972 | Cadiou |
| 3,746,605 | A | 7/1973 | Dillon et al. |
| 3,775,526 | A | 11/1973 | Gilmore |
| 3,867,238 | A | 2/1975 | Johannsen |
| 3,911,185 | A | 10/1975 | Wright, Jr. |
| 3,914,487 | A | 10/1975 | Azoulay |
| 3,922,329 | A | 11/1975 | Kim et al. |
| 4,023,213 | A | 5/1977 | Rovani |
| 4,126,177 | A | 11/1978 | Smith et al. |
| 4,136,222 | A | 1/1979 | Jonnes |
| 4,138,283 | A | 2/1979 | Hanusa |
| 4,197,342 | A | 4/1980 | Bethe |
| 4,255,552 | A | 3/1981 | Schollenberger et al. |
| 4,272,850 | A | 6/1981 | Rule |
| 4,276,341 | A | 6/1981 | Tanaka |
| 4,415,622 | A | 11/1983 | Kamat |
| 4,482,592 | A | 11/1984 | Kramer |
| 4,485,919 | A | 12/1984 | Sandel |
| 4,507,801 | A | 4/1985 | Kavanagh et al. |
| 4,512,037 | A | 4/1985 | Vacanti |
| 4,534,354 | A | 8/1985 | Bonner, Jr. et al. |
| 4,538,301 | A | 9/1985 | Sawatzki et al. |
| 4,581,186 | A | 4/1986 | Larson |
| 4,631,221 | A | 12/1986 | Disselbeck et al. |
| 4,646,367 | A | 3/1987 | El Hassen |
| 4,692,199 | A | 9/1987 | Kozlowski et al. |
| 4,713,854 | A | 12/1987 | Graebe |
| 4,718,214 | A | 1/1988 | Waggoner |
| 4,730,761 | A | 3/1988 | Spano |
| 4,734,306 | A | 3/1988 | Lassiter |
| 4,756,026 | A | 7/1988 | Pierce, Jr. |
| 4,809,374 | A | 3/1989 | Saviez |
| 4,810,559 | A | 3/1989 | Fortier et al. |
| 4,856,393 | A | 8/1989 | Braddon |
| 4,859,274 | A | 8/1989 | Marvel |
| 4,867,826 | A | 9/1989 | Wayte |
| 4,991,230 | A | 2/1991 | Vacanti |
| 5,052,053 | A | 10/1991 | Peart et al. |
| 5,129,295 | A | 7/1992 | Geffros et al. |
| 5,160,785 | A | 11/1992 | Davidson, Jr. |
| 5,168,576 | A | 12/1992 | Krent et al. |
| 5,188,879 | A | 2/1993 | Hill et al. |
| 5,232,762 | A | 8/1993 | Ruby |
| 5,322,730 | A | 6/1994 | Ou |
| 5,353,455 | A | 10/1994 | Loving et al. |
| 5,360,653 | A | 11/1994 | Ackley |
| 5,405,665 | A | 4/1995 | Shukushima et al. |
| 5,423,087 | A | 6/1995 | Krent et al. |
| 5,452,477 | A | 9/1995 | Mann |
| 5,534,208 | A | 7/1996 | Barr et al. |
| 5,551,082 | A | 9/1996 | Stewart et al. |
| 5,594,954 | A | 1/1997 | Huang |
| 5,689,836 | A | 11/1997 | Fee et al. |
| 5,727,252 | A | 3/1998 | Oetting et al. |
| 5,780,147 | A | 7/1998 | Sugahara et al. |
| 5,823,981 | A | 10/1998 | Grim et al. |
| 5,938,878 | A | 8/1999 | Hurley et al. |
| 6,054,005 | A | 4/2000 | Hurley et al. |
| 6,070,267 | A | 6/2000 | McKewin |
| 6,070,273 | A | 6/2000 | Sgro |
| 6,085,353 | A | 7/2000 | van der Sleesen |
| 6,093,468 | A | 7/2000 | Toms et al. |
| 6,167,790 | B1 | 1/2001 | Bambara et al. |
| 6,235,661 | B1 | 5/2001 | Khanamirian |
| 6,253,376 | B1 | 7/2001 | Ritter |
| 6,295,654 | B1 | 10/2001 | Farrell |
| 6,301,722 | B1 | 10/2001 | Nickerson et al. |
| 6,317,888 | B1 | 11/2001 | McFarlane |
| 6,374,409 | B1 | 4/2002 | Galy |
| 6,485,448 | B2 | 11/2002 | Lamping et al. |
| 6,584,616 | B2 | 7/2003 | Godshaw et al. |
| 6,588,019 | B1 | 7/2003 | Whittle, Jr. |
| 6,654,962 | B2 | 12/2003 | DeMott |
| 6,743,325 | B1 | 6/2004 | Taylor |
| 6,820,279 | B2 | 11/2004 | Lesosky |
| 6,841,022 | B2 | 1/2005 | Tsukagoshi et al. |
| 6,851,124 | B2 | 2/2005 | Munoz et al. |
| 6,968,573 | B2 | 11/2005 | Silver |
| 6,969,548 | B1 | 11/2005 | Goldfine |
| 7,007,356 | B2 | 3/2006 | Cudney et al. |
| 2002/0004001 | A1 | 1/2002 | Marx et al. |
| 2004/0171321 | A1 | 9/2004 | Plant |
| 2008/0113143 | A1 | 5/2008 | Taylor |
| 2010/0272969 | A1 | 10/2010 | Taylor |
| 2010/0285299 | A1 | 11/2010 | Taylor |

FOREIGN PATENT DOCUMENTS

| | | | |
|---|---|---|---|
| DE | 4341722 | A1 | 6/1994 |
| DE | 4336468 | | 4/1995 |
| DE | 19640263 | A1 | 4/1998 |
| DE | 202006013732 | U | 2/2007 |
| EP | 1369149 | A1 | 12/2003 |
| FR | 2581348 | A1 | 11/1986 |
| FR | 2635650 | A1 | 3/1990 |
| GB | 800474 | A | 8/1958 |
| GB | 832101 | A | 4/1960 |
| GB | 2304539 | A | 3/1997 |
| JP | 1316235 | A | 12/1989 |
| JP | 2508289 | Y2 | 8/1996 |
| JP | 9300510 | A | 11/1997 |
| JP | 10043007 | A | 2/1998 |
| JP | 10337797 | A | 12/1998 |
| WO | 9733493 | A1 | 9/1997 |
| WO | 9736740 | A1 | 10/1997 |
| WO | 9934972 | A1 | 7/1999 |
| WO | 9935926 | A1 | 7/1999 |
| WO | 0103530 | A1 | 1/2001 |
| WO | 0115892 | A1 | 3/2001 |
| WO | 0216124 | A1 | 2/2002 |
| WO | 02081202 | A1 | 10/2002 |
| WO | 2006036072 | A1 | 4/2006 |
| WO | 2006088734 | A2 | 8/2006 |

OTHER PUBLICATIONS

Plaintiffs' Answer To Defendant Nike's Counterclaims In Answer Io Plaintiffs' Fourth Amended Complaint, filed Jul. 26, 2012, *McDavid Knee Guard, Inc.* v. *Nike USA, Inc.*, Civil No. 08-CV-6584, (Doc. No. 506), 5 pages.

Plaintiffs' Opposition To Nike USA Inc.'s Motion For Summary Judgment Of Invalidity, filed Jul. 26, 2012, *McDavid Knee Guard, Inc.* v. *Nike USA, Inc.*, Civil No. 08-CV-6584, (Doc. No. 507), 22 pages.

Plaintiffs' Response To Defendant Nike USA, Inc.'s Statement Of Undisputed Materials Facts Pursuant To Local Rule 4 56.1 In Support Of Defendant's Motion For Summary Judgment Of Invalidity And Plaintiffs' Additional Undisputed Facts That Support Denial Of Summary Judgment, filed Jul. 26, 2012, *McDavid Knee Guard, Inc.* v. *Nike USA, Inc.*, Civil No. 08-CV-6584, (Doc. No. 509), 23 pages.

Declaration Of Jared E. Hedman In Support Of Plaintiffs' Opposition To Nike's Motion For Summary Judgment Of Invalidity, filed Jul. 26, 2012, *McDavid Knee Guard, Inc.* v. *Nike USA, Inc.*, Civil No. 08-CV-6584, (Doc. No. 510), 137 pages.

Declaration Of Glenn L. Beall In Support Of Plaintiffs' Opposition To Nike's Motion For Summary Judgment Of Invalidity, filed Jul. 26, 2012, *McDavid Knee Guard, Inc.* v. *Nike USA, Inc.*, Civil No. 08-CV-6584, (Doc. No. 511), 14 pages.

(56) References Cited

OTHER PUBLICATIONS

Defendant Nike USA Inc.'s Reply In Support Of Motion For Summary Judgment Of Invalidity, filed Aug. 16, 2012, *McDavid Knee Guard, Inc.* v. *Nike USA, Inc.,* Civil No. 08-CV-6584, (Doc. No. 514), 21 pages.
Defendant Nike USA Inc.'s Response To Plaintiffs' Additional Statements Of Undisputed Facts Pursuant To Local Rule 56.1, filed Aug. 16, 2012, *McDavid Knee Guard, Inc.* v. *Nike USA, Inc.,* Civil No. 08-CV-6584, (Doc. No. 515), 18 pages.
Declaration Of Ryan J. Schletzbaum In Support Of Nike's Reply In Support Of Nike's Reply In Support Of Nike's Motion For Summary Judgement Of Invalidity, filed Aug. 16, 2012, *McDavid Knee Guard, Inc.* v. *Nike USA, Inc.,* Civil No. 08-CV-6584, (Doc. No. 516), 103 pages.
Defendant Nike USA Inc.'s Initial Invalidity Contentions For U.S. Reissue Patent No. RE43,441, *McDavid Knee Guard, Inc.* v. *Nike USA, Inc.,* Civil No. 08-CV-6584, 58 pages.
Plaintiff's Surreply in Opposition to Nike's Motion for Summary Judgment of Invalidity, *McDavid Knee Guard, Inc.* v. *Nike USA, Inc.,* Civil No. 08-CV-6584, (Doc. No. 518), 19 pages.
Plaintiffs' Initial Response to Defendant Nike USA Inc.'s Initial Invalidity Contentions for U.S. Reissue Patent No. RE43,441 and supporting charts, *McDavid Knee Guard, Inc.* v. *Nike USA, Inc.,* Civil No. 08-CV-6584, dated Aug. 27, 2012, 269 pages.
Memorandum in Support of Plaintiffs' Motion for Preliminary Injunction, filed May 28, 2009, and Exhibits 1-10 thereto (Public (Redacted) Version) Doc. No. 54).
Corrected Version of Exhibit 2, Part 1 to the Memorandum in Support of Plaintiffs' Motion for Preliminary Injunction, filed Jun. 5, 2009 (Doc. No. 62).
Plaintiffs' Claim Construction Memorandum, filed Jun. 15, 2009, and Exhibits 1-6 thereto (Doc. No. 67).
Responsive Claim Construction Brief of Defendant Nike USA, Inc., filed Jul. 13, 2009 (Redacted) (Doc. No. 95).
Declaration of Alyson G. Barker in Support of Nike USA's Responsive Claim Construction, filed Jul. 13, 2009, and Exhibit A thereto (Doc. No. 96).
Plaintiffs' Rebuttal Memorandum on Claim Construction, filed Jul. 13, 2009, and Exhibits 1-5 thereto (Doc. No. 97).
Joint Claim Construction Chart and Status Report, filed Sep. 1, 2009 (Doc. No. 135).
Memorandum Opinion and Order Construing Disputed Claim Terms, entered Sep. 17, 2009, Honorable James F. Holderman (Doc. No. 137).
Memorandum Opinion and Order denying motion for preliminary injunction signed by the Honorable James F. Holderman on Jan. 14, 2010—*McDavid Knee Guard, Inc.* v. *Nike USA, Inc.,* Civil No. 08-CV-6584 (Doc. No. 171).
Plaintiff's Opening Claim Construction Memorandum dated Nov. 5, 2010—*McDavid Knee Guard, Inc.* v. *Nike USA, Inc.,* Civil No. 08-CV-6584 (Doc. No. 307).
Declaration of Alyson G. Barker in Support of Defendant Nike USA, Inc.'s Responsive Claim Construction Brief re Reissue Patent dated Nov. 19, 2010—*McDavid Knee Guard, Inc.* v. *Nike USA, Inc.,* Civil No. 08-CV-6584 (Doc. No. 311).
Plaintiffs' Response to Defendant Nike's Opening Claim Construction Brief dated Nov. 19, 2010—*McDavid Knee Guard, Inc.* v. *Nike USA, Inc.,* Civil No. 08-CV-6584 (Doc. No. 318).
Plaintiffs' Reply to Defendant Nike USA, Inc.'s Opposition to Plaintiffs' Motion for Summary Judgment of Infringement dated Dec. 10, 2010—*McDavid Knee Guard, Inc.* v. *Nike USA, Inc.,* Civil No. 08-CV-6584 (Doc. No. 323).
Reply by Plaintiffs McDavid Knee Guard, Inc., Stirling Mouldings Limited to Nike's Responsive Claim Construction Brief dated Dec. 10, 2010—*McDavid Knee Guard, Inc.* v. *Nike USA, Inc.,* Civil Action No. 08-CV-6584 (Doc. No. 324).
Mandate of USCA Federal Circuit dated Dec. 9, 2010 regarding Notice of Appeal related to denial of motion for preliminary injunction on Dec. 15, 2010—*McDavid Knee Guard, Inc.* v. *Nike USA, Inc.,* Civil No. 08-CV-6584 (Doc. No. 325).
Memorandum Opinion and Order, case No. 1:08-cv-06584, filed Aug. 17, 2011, 32 pages (Doc. No. 345).
Third Amended Complaint dated Sep. 16, 2011—*McDavid Knee Guard, Inc.* v. *Nike USA, Inc.,* Civil No. 08-CV-6584 (Doc. No. 355).
Plaintiffs' Motion for Reconsideration of Order Granting Nike's Motion for Summary Judgment of Non-Infringement of Claim 1 of the '346 Patent Under The Doctrine of Equivalents dated Sep. 19, 2011—*McDavid Knee Guard, Inc.* v. *Nike USA, Inc.,* Civil No. 08-CV-6584 (Doc. No. 356).
Defendant Nike USA Inc.'s Opposition to Plaintiff's Motion to Reconsider Order Granting Nike's Motion for Summary Judgment dated Sep. 23, 2011—*McDavid Knee Guard, Inc.* v. *Nike USA, Inc.,* Civil No. 08-CV-6584. (Doc. No. 358).
Plaintiffs' Reply Brief in Support of Plaintiff's Motion for Reconsideration of Order Granting Nike's Motion for Summary Judgment of Non-Infringement of Claim 1 of the '346 Patent Under the Doctrine of Equivalents dated Sep. 30, 2011—*McDavid Knee Guard, Inc.* v. *Nike USA, Inc.,* Civil No. 08-CV-6584 (Doc. No. 361).
Nike USA, Inc.'s Motion for Partial Dismissal of Plaintiff's Third Amended Complaint dated Oct. 7, 2011—*McDavid Knee Guard, Inc.* v. *Nike USA, Inc.,* Civil No. 08-CV-6584 (Doc. No. 363).
Opinion dated Oct. 19, 2011 regarding Motion For Reconsideration of Order Granting Nike's Motion for Summary Judgment of Non-infringement of claim 1 of the '346 Patent Under the Doctrine of Equivalents—*McDavid Knee Guard, Inc.* v. *Nike USA, Inc.,* Civil No. 08-CV-6584 (Doc. No. 366).
Plaintiffs' Opposition to Defendant Nike's Motion for Partial Dismissal of Plaintiffs' Third Amended Complaint dated Oct. 27, 2011—*McDavid Knee Guard, Inc.* v. *Nike USA, Inc.,* Civil No. 08-CV-6584 (Doc. No. 367).
Memorandum in Support of Plaintiffs' Motion for Summary Judgment of Infringement of U.S. Reissue Patent RE42,689 dated Nov. 9, 2011—*McDavid Knee Guard, Inc.* v. *Nike USA, Inc.,* Civil No. 08-CV-6584 (Doc. No. 371).
Plaintiffs' Statement of Material Facts Pursuant to Local Rule 56.1 in Support of Plaintiffs' Motion for Summary Judgment of Infringement of U.S. Patent Reissue Patent RE42,689 dated Nov. 9, 2011—*McDavid Knee Guard, Inc.* v. *Nike USA, Inc.,* Civil No. 08-CV-6584 (Doc. No. 375).
Nike USA Inc.'s Reply Brief in Support of Motion for Partial Dismissal of Plaintiffs' Third Amended Complaint dated Nov. 10, 2011—*McDavid Knee Guard, Inc.* v. *Nike USA, Inc.,* Civil No. 08-CV-6584 (Doc. No. 379).
Minute Order dated Nov. 15, 2011 regarding Nike's Motion for Partial Dismissal of Plaintiffs' Third Amended Complaint—*McDavid Knee Guard, Inc.* v. *Nike USA, Inc.,* Civil No. 08-CV-6584 (Doc. No. 380).
Transcript of Proceedings held on Nov. 15, 2011—*McDavid Knee Guard, Inc.* v. *Nike USA, Inc.,* Civil No. 08-CV-6584 (Doc. No. 388).
Plaintiffs' Brief Regarding the Patent Office's Consideration of the Court's Claim Construction in the Prosecution History of U.S. Reissue Patent RE42,689 dated Dec. 12, 2011—*McDavid Knee Guard, Inc.* v. *Nike USA, Inc.,* Civil No. 08-CV-6584 (Doc. No. 389).
Defendant's Memorandum Regarding Prosecution History of U.S. patent RE 42,689 dated Dec. 12, 2011—*McDavid Knee Guard, Inc.* v. *Nike USA, Inc.,* Civil No. 08-CV-6584 (Doc. No. 390).
Plaintiffs' Response to Nike's Memorandum Regarding the Prosecution History of U.S. Reissue Patent 42,689 dated Dec. 19, 2011—*McDavid Knee Guard, Inc.* v. *Nike USA, Inc.,* Civil No. 08-CV-6584 (Doc. No. 392).
Transcript of Proceedings held on Dec. 20, 2011—*McDavid Knee Guard, Inc.* v. *Nike USA, Inc.,* Civil No. 08-CV-6584 (Doc. No. 393).
Defendant's Response to Motion for Summary Judgment of Infringement of U.S. Reissue Patent RE42,689 Pursuant to Local Rule 56.1 dated Feb. 3, 2010—*McDavid Knee Guard, Inc.* v. *Nike USA, Inc.,* Civil No. 08-CV-6584 (Doc. No. 409).
Nike's Response to Plaintiff's Statement of Fact dated Feb. 3, 2012—*McDavid Knee Guard, Inc.* v. *Nike USA, Inc.,* Civil No. 08-CV-6584 (Doc. No. 415).
Declaration of Turner regarding Nike's Response to Plaintiffs Statements of Fact dated Feb. 3, 2012—*McDavid Knee Guard, Inc.* v. *Nike USA, Inc.,* Civil No. 08-CV-6584 (Doc. No. 416).

(56) References Cited

OTHER PUBLICATIONS

Declaration of Schletzbaum regarding Nike's Response to Plaintiffs Statements of Fact dated Feb. 3, 2012—*McDavid Knee Guard, Inc.* v. *Nike USA, Inc.*, Civil No. 08-CV-6584 (Doc. No. 417).
Declaration of Brookstein regarding Nike's Response to Plaintiffs Statements of Fact dated Feb. 3, 2012—*McDavid Knee Guard, Inc.* v. *Nike USA, Inc.*, Civil No. 08-CV-6584 (Doc. No. 429).
Motion by Nike USA, Inc. to amendlcorrect Non-Infringement and Invalidity Contentions Pursuant to Local Patent Rule 3.4 dated Feb. 24, 2012—*McDavid Knee Guard, Inc.* v. *Nike USA, Inc.*, Civil Action No. 08-CV-6584 (Doc. No. 437).
Response by McDavid Knee Guard, Inc. in Opposition to Motion by Nike USA, Inc. to amend correct Non-Infringement and Invalidity Contentions Pursuant to Local Patent Rule 3.4 dated Feb. 29, 2012—*McDavid Knee Guard, Inc.* v. *Nike USA, Inc.*, Civil Action No. 08-CV-6584 (Doc. No. 439).
Reply by McDavid Knee Guard, Inc., Stirling Mouldings Limited to response in opposition to motion Reply in Support of Plaintiffs' Motion for Summary Judgment of Infringement of U.S. Reissue Patent RE42,689 dated Feb. 29, 2012—*McDavid Knee Guard, Inc.* v. *Nike USA, Inc.*, Civil Action No. 08-CV-6584 (Doc. No. 440).
Response to Defendant's Additional Statement of Facts by McDavid Knee Guard, Inc., Stirling Mouldings Limited dated Feb. 29, 2012—*McDavid Knee Guard, Inc.* v. *Nike USA, Inc.*, Civil Action No. 08-CV-6584 (Doc. No. 443).
Reply by Nike USA, Inc. in Support of its Motion to Amend Non-Infringement and Invalidity Contentions dated Feb. 29, 2012—*McDavid Knee Guard, Inc.* v. *Nike USA, Inc.*, Civil Action No. 08-CV-6584 (Doc. No. 444).
Minute Entry before Honorable James F. Holderman on Mar. 1, 2012 authorizing supplementation of invalidity contentions—*McDavid Knee Guard, Inc.* v. *Nike USA, Inc.*, Civil Action No. 08-CV-6584 (Doc. No. 446).
Minute Entry before Honorable James F. Holderman on Mar. 5, 2012 denying Plaintiff's Motion for Summary Judgment—*McDavid Knee Guard, Inc.* v. *Nike USA, Inc.*, Civil Action No. 08-CV-6584 (Doc. No. 449).
Nike's Invalidity Contention Charts 1-21 (non-confidential attachments to confidential Supplemental Invalidity Contentions)—*McDavid Knee Guard, Inc.* v. *Nike USA, Inc.*, Civil Action No. 08-CV-6584.
McDavid's Reply to Defendant's Supplemental Invalidity Contentions regarding U.S. Reissue Patent 42,689 dated Apr. 5, 2012—*McDavid Knee Guard, Inc.* v. *Nike USA, Inc.*, Civil Action No. 08-CV-6584.
Memorandum Opinion and Order dated Mar. 5. 2012—*McDavid Knee Guard. Inc.* v. *Nike USA, Inc.*, Civil No. 08-CV-6584 (Doc. No. 450)., 11 pages.
Nike's Motion for Summary Judgment of Invalidity dated Apr. 19, 2012—*McDavid Knee Guard, Inc.* v. *Nike USA, Inc.*, Civil Action No. 08-CV-6584 (Doc. No. 454).
Nike's Memorandum in Support of Motion for Summary Judgment of Invalidity dated Apr. 19, 2012—*McDavid Knee Guard, Inc.* v. *Nike USA, Inc.*, Civil Action No. 08-CV-6584 (Doc. No. 458).
Nike's Statements of Undisputed Material Facts Pursuant to Local Rule 56.1 in Support of Defendant's Motion for Summary Judgment of Invalidity dated Apr. 19, 2012—*McDavid Knee Guard, Inc.* v. *Nike USA, Inc.*, Civil Action No. 08-CV-6584 (Doc. No. 459).
Declaration of Schletzbaum regarding Motion for Summary Judgment of Invalidity dated Apr. 19, 2012 dated Apr. 19, 2012—*McDavid Knee Guard, Inc.* v. *Nike USA, Inc.*, Civil Action No. 08-CV-6584 (Doc. No. 460).
Nike's Motion for Summary Judgment of Non-Infringement dated Apr. 19, 2012—*McDavid Knee Guard, Inc.* v. *Nike USA, Inc.*, Civil Action No. 08-CV-6584 (Doc. No. 462).
Nike's Memorandum and Points of Authorities in Support of Defendant's Motion for Summary Judgment of Non-Infringement dated Apr. 19, 2012—*McDavid Knee Guard, Inc.* v. *Nike USA, Inc.*, Civil Action No. 08-CV-6584 (Doc. No. 465).
Nike's Statement of Undisputed Material Facts Pursuant to Local Rule 56.1 in Support of Defendant's Motion for Summary Judgment of Non-Infringement dated Apr. 19, 2012—*McDavid Knee Guard, Inc.* v. *Nike USA, Inc.*, Civil Action No. 08-CV-6584 (Doc. No. 466).
Declaration of Schletzbaum regarding Motion for Summary Judgment of Non-Infringement dated Apr. 19, 2012—*McDavid Knee Guard, Inc.* v. *Nike USA, Inc.*, Civil Action No. 08-CV-6584 (Doc. No. 467).
McDavid's Motion for Summary Judgment of No Invalidity of US Patent No. RE42,689 dated Apr. 19, 2012—*McDavid Knee Guard, Inc.* v. *Nike USA, Inc.*, Civil Action No. 08-CV-6584 (Doc. No. 470).
McDavid's Memorandum in Support of Motion for Summary Judgment of No Invalidity of US Patent No. RE42,689 dated Apr. 19, 2012—*McDavid Knee Guard, Inc.* v. *Nike USA, Inc.*, Civil Action No. 08-CV-6584 (Doc. No. 471).
McDavid's Rule 56(a) Statement regarding Motion for Summary Judgment of No Invalidity US Patent No. RE42,689 dated Apr. 19, 2012—*McDavid Knee Guard, Inc.* v. *Nike USA, Inc.*, Civil Action No. 08-CV-6584 (Doc. No. 472).
Nike's Motion to Strike Plaintiffs' Reply to Nike's Non-Infringement Contentions dated Apr. 19, 2012—*McDavid Knee Guard, Inc.* v. *Nike USA, Inc.*, Civil Action No. 08-CV-6584 (Doc. No. 473).
Declaration of Jaren E. Hedman regarding Motion for Summary Judgment of No Invalidity of US Patent No. RE42,689 Under 35 USC 251 dated Apr. 19, 2012—*McDavid Knee Guard, Inc.* v. *Nike USA, Inc.*, Civil Action No. 08-CV-6584 (Doc. No. 474).
McDavid's Motion for Summary Judgment of No Invalidity of US Patent No. RE42,689 Under 35 USC 112 dated Apr. 19, 2012—*McDavid Knee Guard, Inc.* v. *Nike USA, Inc.*, Civil Action No. 08-CV-6584 (Doc. No. 477).
McDavid's Memorandum in Support of Motion for Summary Judgment of No Invalidity of US Patent No. RE42,689 Under 35 USC 112 dated Apr. 19, 2012—*McDavid Knee Guard, Inc.* v. *Nike USA, Inc.*, Civil Action No. 08-CV-6584 (Doc. No. 478).
McDavid's Statement of Material Facts Pursuant to Local Rule 56.1 in Support of Plaintifrs Motion for Summary Judgment of No Invalidity of US Patent No. RE42,689 Under 35 USC 112 dated Apr. 19, 2012—*McDavid Knee Guard, Inc.* v. *Nike USA, Inc.*, Civil Action No. 08-CV-6584 (Doc. No. 479).
Declaration of Glenn L. Beall regarding Motion for Summary Judgment in Support of Plaintifrs Motion for Summary 22 Judgment of No Invalidity of US Patent No. RE42,689 Under 35 USC 112 dated Apr. 19, 2012—*McDavid Knee Guard, Inc.* v. *Nike USA, Inc.*, Civil Action No. 08-CV-6584 (Doc. No. 480).
Declaration of Henkelmann regarding Motion for Summary Judgment in Support of Plaintiffs' Motion for Summary Judgment of No Invalidity of US Patent No. RE42,689 Under 35 USC 112 dated Apr. 19, 2012—*McDavid Knee Guard, Inc.* v. *Nike USA, Inc.*, Civil Action No. 08-CV-6584 (Doc. No. 481).
McDavid's Motion for Claim Construction of US Patent No. RE42,689 dated Apr. 19, 2012—*McDavid Knee Guard, Inc.* v. *Nike USA, Inc.*, Civil Action No. 08-CV-6584 (Doc. No. 483).
McDavid's Memorandum in Support of Motion for Miscellaneous Relief for Claim Construction of US Patent No. RE42,689 dated Apr. 19, 2012—*McDavid Knee Guard, Inc.* v. *Nike USA, Inc.*, Civil Action No. 08-CV-6584 (Doc. No. 484).
Corrected Plaintiffs' Statement of Material Facts Pursuant to Local Rule 56.1 in Support of Plaintiffs' Motion for Summary Judgment of No Invalidity of U.S. Patent No. RE42,689 Under 35 USC 112 dated Apr. 19, 2012—*McDavid Knee Guard, Inc.* v. *Nike USA, Inc.*, Civil Action No. 08-CV-6584 (Doc. No. 486).
Jeff Hopkins, "Advances, Advantages, and Techniques of Hot Melt Adhesives", Journal of Industrial Textiles (1993), pp. 5-13.
John Halbmaier, "Overview of Hot Melt Adhesives Application Equipment for Coating and Laminating Full-Width Fabrics," Journal of Industrial Textiles (1992) pp. 301-310.
Walter Fung, "Coated and Laminated Textiles", (2002), pp. 114-133.
SAE Specification AMS 3698A, (Jul. 1, 1987), 13 pages.
SAE Specification AMA 3698B (Jan. 1, 1993), 1 page.
Sarna Xiro GmbH, EC Safety Data Sheet, Jan. 16, 2001, 5 pages.
Watson, Chris, "Hot Melt Coating Methods: The More They Change the More They Stay the Same," 1996 Hot Melt Symposium Tappi Proceedings (1996), pp. 1-5.

(56) References Cited

OTHER PUBLICATIONS

Hoffman, Edward G., "Jig and Fixture Design" (1980), pp. 205-219.
Bender, Rene J., "Handbook of Foamed Plastics" (1965), pp. 285-293.
Walker, John R., "Machining Fundamentals—From Basic to Applied Techniques" (1993), pp. 502-503.
Lascoe, O.D., "Handbook of Fabrication Processes" (1988), p. 215.
Petrie, Edward M., "Handbook of Adhesives and Sealants" (2000), p. 308.
Roff, W.J., et al., "Handbook of Common Polymers—Fibres, Films, Plastics and Rubbers" (1971), p. 456.
Protecting Your Assets, World Sports Activewear, vol. 2, Issue 3 (Autumn 1996), pp. 24-28.
"ESC Steel Rule Dies," available at http://escutters.co.uk/#/laser-flat-bed/4525904364 (last visited Mar. 30, 2010), 1 page.
"Hot Melt Adhesives Technology Review," Pacific Northwest Pollution Prevention Resource Center (Sep. 1988), available at http://pprc.org/pubs/techreviews/hotmelt.hmintro.html (last visited Mar. 30, 2010), 2 pages.
U.S. Appl. No. 12/642,522, filed Dec. 18, 2009, Applicant: David Stirling Taylor.
Defendant-Appellee Appeal Brief in the United States Court of Appeals for the Federal Circuit 2010-1171 (from the United States District Court for the Northern District of Illinois) dated May 11, 2010—*McDavid Knee Guard, Inc.* v. *Nike USA, Inc.,* Civil No. 08-CV-6584.
Plaintiff-Appellant Appeal Brief in the United States Court of Appeals for the Federal Circuit 2010-1171 (from the United States District Court for the Northern District of Illinois) dated Mar. 29, 2010—*McDavid Knee Guard, Inc.* v. *Nike USA, Inc.,* Civil No. 08-CV-6584.
Plaintiff's Reply Brief in the United States Court of Appeals for the Federal Circuit 2010-1171 (from the United States District Court for the Northern District of Illinois) dated May 28, 2010—*McDavid Knee Guard, Inc.* v. *Nike USA, Inc.,* Civil No. 08-CV-6584.
Supplemental Invalidity Report of David Brookstein, Sc.D. Under Rule 26(a)(2)(B) of the Federal Rules of Civil Procedure Regarding Reissue U.S. Patent RE42,689 dated Jun. 4, 2012—*McDavid Knee Guard, Inc.* v. *Nike USA, Inc.,* Civil No. 08-CV-6584.
Response by Defendant Nike USA Inc. regarding Plaintiffs' Brief Regarding the Patent Office's Consideration of the Court's Claim Construction in the Prosecution History of U.S. Reissue Patent RE42,689 dated Dec. 19, 2011—*McDavid Knee Guard, Inc.* v. *Nike USA, Inc.,* Civil No. 08-CV-6584 (Doc. No. 391).
Plaintiffs' Motion for Leave to File Fourth Amended Complaint dated Jun. 7, 2012—*McDavid Knee Guard, Inc.* v. *Nike USA, Inc.,* Civil No. 08-CV-6584 (Docket No. 500).
Plaintiffs' Notice of Motion for presentment of Motion for Leave to File Fourth Amended Complaint dated Jun. 7, 2012—*McDavid Knee Guard, Inc.* v. *Nike USA, Inc.,* Civil No. 08-CV-6584 (Docket No. 501).
Minute Entry Order granting Plaintiffs' Notice of Motion for presentment of Motion for Leave to File Fourth Amended Complaint dated Jun. 11, 2012—*McDavid Knee Guard, Inc.* v. *Nike USA, Inc.,* Civil No. 08-CV-6584 (Docket No. 502).
Plaintiffs' Fourth Amended Complaint dated Jun. 14, 2012—*McDavid Knee Guard, Inc.* v. *Nike USA, Inc.,* Civil No. 08-CV-6584 (Docket No. 503).
Redacted Highly Confidential Expert Report of Glenn L. Beall Regarding the Validity of U.S. Reissued Patent No. RE42,689 dated Jun. 19, 2012—*McDavid Knee Guard, Inc.* v. *Nike USA, Inc.,* Civil No. 08-CV-6584.
Defendant Nike USA, Inc.'s Response to Plaintiffs' Sur-reply on Nike's Motion for Summary Judgment of Invalidity dated Sep. 6, 2012, *McDavid Knee Guard, Inc.* v. *Nike USA, Inc.,* Civil No. 08-CV-6584, (Doc. No. 523), 15 pages.
Memorandum Opinion and Order dated Sep. 19, 2012, *McDavid Knee Guard, Inc.* v. *Nike USA, Inc.,* Civil No. 08-CV-6584, (Doc. No. 525), 27 pages.
Nike's Motion for Summary Judgment of Invalidity dated Oct. 18, 2012, *McDavid Knee Guard, Inc.* v. *Nike USA, Inc.,* Civil No. 08-CV-6584, (Doc. No. 527), 3 pages.
Nike's Memorandum in Support of Motion for Summary Judgment of Invalidity dated Oct. 18, 2012, *McDavid Knee Guard, Inc.* v. *Nike USA, Inc.,* Civil No. 08-CV-6584, (Doc. No. 528), 13 pages.
Nike's Rule 56.1 Statement regarding Motion for Summary Judgment dated Oct. 18, 2012, *McDavid Knee Guard, Inc.* v. *Nike USA, Inc.,* Civil No. 08-CV-6584, (Doc. No. 530), 11 pages.
Declaration of Schletzbaum regarding Motion for Summary Judgment of Invalidity dated Oct. 18, 2012, *McDavid Knee Guard, Inc.* v. *Nike USA, Inc.,* Civil No. 08-CV-6584, (Doc. No. 531), 39 pages.
Nike's Motion for Summary Judgment of Non-Infringement dated Oct. 18, 2012, *McDavid Knee Guard, Inc.* v. *Nike USA, Inc.,* Civil No. 08-CV-6584, (Doc. No. 533), 3 pages.
Nike's Memorandum in Support of Motion for Summary Judgment of Non-Infringement dated Oct. 18, 2012, *McDavid Knee Guard, Inc.* v. *Nike USA, Inc.,* Civil No. 08-CV-6584, (Doc. No. 534), 19 pages.
Nike's Rule 56.1 Statement regarding Motion for Summary Judgment Non-Infringement dated Oct. 18, 2012, *McDavid Knee Guard, Inc.* v. *Nike USA, Inc.,* Civil No. 08-CV-6584, (Doc. No. 536), 11 pages.
Declaration of Schletzbaum regarding Motion for Summary Judgment of Non-Infringement dated Oct. 18, 2012, *McDavid Knee Guard, Inc.* v. *Nike USA, Inc.,* Civil No. 08-CV-6584, (Doc. No. 537), 101 pages.
Plaintiffs' Objections to Nike's Motion for Summary Judgment of Non-Infringement of U.S. Patent No. RE41,346 dated Oct. 30, 2012, *McDavid Knee Guard, Inc.* v. *Nike USA, Inc.,* Civil No. 08-CV-6584, (Doc. No. 549), 21 pages.
Minute Entry Order before Honorable James F. Holderman—Defendant Nike's Motion for Summary Judgment of Non-Infringement of U.S. Patent No. RE41,346 is denied, *McDavid Knee Guard, Inc.* v. *Nike USA, Inc.,* Civil No. 08-CV-6584, (Doc. No. 551), 1 page.
Plaintiff's Response in Opposition to Defendant's Motion for Summary Judgment of Invalidity of U.S. Patent No. RE 43,441 dated Nov. 8, 2012, *McDavid Knee Guard, Inc.* v. *Nike USA, Inc.,* Civil No. 08-CV-6584, (Doc. No. 552), 21 pages.
Plaintiff's Response in Opposition to Defendant's Motion regarding Plaintiffs' Response to Defendant's Statement of Undisputed Material Facts Pursuant to Local Rule 56.1, dated Nov. 8, 2012, *McDavid Knee Guard, Inc.* v. *Nike USA, Inc.,* Civil No. 08-CV-6584, (Doc. No. 554), 16 pages.
Declaration of Karl R. Fink regarding Response in Opposition to Motion, dated Nov. 8, 2012, *McDavid Knee Guard, Inc.* v. *Nike USA, Inc.,* Civil No. 08-CV-6584, (Doc. No. 555), 157 pages.
Declaration of Glenn Beall regarding Response in Opposition to Motion, dated Nov. 8, 2012, *McDavid Knee Guard, Inc.* v. *Nike USA, Inc.,* Civil No. 08-CV-6584, (Doc. No. 556), 12 pages.
Minute Order dated Nov. 9, 2012, *McDavid Knee Guard, Inc.* v. *Nike USA, Inc.,* Civil No. 08-CV-6584, (Doc. No. 557), 1 pages.
Memorandum Opinion and Order dated Nov. 9, 2012, *McDavid Knee Guard, Inc.* v. *Nike USA, Inc.,* Civil No. 08-CV-6584, (Doc. No. 558), 2 pages.
Defendant Nike USA's Motion in Limine regarding Exclude all Evidence of Equivalents, Declaration of Schletzbaum and Exhibit A dated Apr. 1, 2013, *McDavid Knee Guard, Inc.* v. *Nike USA, Inc.,* Civil No. 08-CV-6584, (Doc. No. 579), 15 pages.
Defendant Nike USA's Motion in Limine No. 2 regarding Exclude all Evidence of Willful Infringement, Declaration of Schletzbaum and Exhibit A dated Apr. 1, 2013, *McDavid Knee Guard, Inc.* v. *Nike USA, Inc.,* Civil No. 08-CV-6584, (Doc. No. 580), 19 pages.
Defendant Nike USA Inc's Motion in Limine #1 to Exclude Plaintiffs' Evidence that Excess Material Is Equivalent to a Jig dated Apr. 3, 2013, *McDavid Knee Guard, Inc.* v. *Nike USA, Inc.,* Civil No. 08-CV-6584, (Doc. No. 588), 1 page.
Order dated Apr. 3, 2013, *McDavid Knee Guard, Inc.* v. *Nike USA, Inc.,* Civil No. 08-CV-6584, (Doc. No. 589), 1 page.
Minute Entry Order dated Apr. 4, 2013, *McDavid Knee Guard, Inc.* v. *Nike USA, Inc.,* Civil No. 08-CV-6584, (Doc. No. 590), 1 page.
Supplemental Declaration of Ryan J. Schletzbaum in Support of Nike's Motion to Strike Plaintiffs' New Expert Opinions and Supple-

(56) References Cited

OTHER PUBLICATIONS mental Interrogatory Response dated Apr. 5, 2013, *McDavid Knee Guard, Inc.* v. *Nike USA, Inc.,* Civil No. 08-CV-6584, (Doc. No. 591), 3 pages.
Plaintiff's Response to Nike's Motion to Strike Planitiff's Expert Opinions and Supplemental Interrogatory Response dated Apr. 15, 2013, *McDavid Knee Guard, Inc.* v. *Nike USA, Inc.,* Civil No. 08-CV-6584, (Doc. No. 595), 21 pages.
Declaration of Karl R. Fink in support of Plaintiff's Opposition to Defendant Nike's Motion to Strike Plaintiff's New Expert Opinions and Supplemental Interrogatory Response dated Apr. 15, 2013, *McDavid Knee Guard, Inc.* v. *Nike USA, Inc.,* Civil No. 08-CV-6584, (Doc. No. 596), 10 pages.
Defendant Nike's Reply in Support of Nike's Motion to Strike Plaintiffs' New Expert Opinions and Supplemental Interrogatory Response dated Apr. 22, 2013, *McDavid Knee Guard, Inc.* v. *Nike USA, Inc.,* Civil No. 08-CV-6584, (Doc. No. 602), 21 pages.
Memorandum Opinion and Order dated Apr. 23, 2013, *McDavid Knee Guard, Inc.* v. *Nike USA, Inc.,* Civil No. 08-CV-6584, (Doc. No. 604), 9 pages.
Motion to Exclude all Testimony from Mr. James L. McGovern by Nike USA, Inc., dated May 6, 2013, *cDavid Knee Guard, Inc.* v. *Nike USA, Inc.,* Civil No. 08-CV-6584, (Doc. No. 607), 3 pages.
Minute Entry Order dated May 1, 2013, *McDavid Knee Guard, Inc.* v. *Nike USA, Inc.,* Civil No. 08-CV-6584, (Doc. No. 611), 1 page.
Nike's Motion to Correct Inventorship dated May 9, 2013, *McDavid Knee Guard, Inc.* v. *Nike USA, Inc.,* Civil No. 08-CV-6584, (Doc. No. 612), 3 pages.
Motion by Defendant Nike USA, Inc. For leave to file Amended Answer, dated May 9, 2013, *McDavid Knee Guard, Inc.* v. *Nike USA, Inc.,* Civil No. 08-CV-6584, (Doc. No. 622), 3 pages.
Exhibit List to Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 623), 1 page.
Exhibit 4 to Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 625), 21 pages.
Exhibit 5 to Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 626), 12 pages.
Exhibit 3-1 to Memorandum in Support of its Motion for Leave to File Amended Answer dated May 9, 2013, *McDavid Knee Guard, Inc.* v. *Nike USA, Inc.,* Civil No. 08-CV-6584, (Doc. No. 628), 4 pages.
Exhibit 3-1a to Memorandum of Law in Support of Motion for Leave to File Amended Answer, dated May 9, 2013, *McDavid Knee Guard, Inc.* v. *Nike USA, Inc.,* Civil No. 08-CV-6584, (Doc. No. 629), 6 pages.
Exhibit 3-2 to Memorandum in Support of its Motion for Leave to File Amended Answer dated May 9, 2013, *McDavid Knee Guard, Inc.* v. *Nike USA, Inc.,* Civil No. 08-CV-6584, (Doc. No. 630), 4 pages.
Exhibit 3-1b to Memorandum of Law in Support of Motion for Leave to File an Amended Answer, dated May 9, 2013, *McDavid Knee Guard, Inc.* v. *Nike USA, Inc.,* Civil No. 08-CV-6584, (Doc. No. 631), 8 pages.
Exhibits 1, 2, 6, 7, 8 to Memorandum of Law in Support of Motion for Leave to File Amended Answer, dated May 9, 2013, *McDavid Knee Guard, Inc.* v. *Nike USA, Inc.,* Civil No. 08-CV-6584, (Doc. No. 632), 79 pages.
Exhibit 3-2a to Memorandum of Law in Support of Motion for Leave to File an Amended Answer, dated May 9, 2013, *McDavid Knee Guard, Inc.* v. *Nike USA, Inc.,* Civil No. 08-CV-6584, (Doc. No. 633), 2 pages.
Exhibit 3-2b to Memorandum of Law in Support of Motion for Leave to File an Amended Answer, dated May 9, 2013, *McDavid Knee Guard, Inc.* v. *Nike USA, Inc.,* Civil No. 08-CV-6584, (Doc. No. 634), 2 pages.
Exhibit 3-3 to Memorandum of Law in Support of Motion for Leave to File an Amended Answer, dated May 9, 2013, *McDavid Knee Guard, Inc.* v. *Nike USA, Inc.,* Civil No. 08-CV-6584, (Doc. No. 635), 3 pages.
Exhibit 3-4a to Memorandum of Law in Support of Motion for Leave to File an Amended Answer, dated May 9, 2013, *McDavid Knee Guard, Inc.* v. *Nike USA, Inc.,* Civil No. 08-CV-6584, (Doc. No. 636), 2 pages.
Exhibit 3-4b to Memorandum of Law in Support of Motion for Leave to File an Amended Answer, dated May 9, 2013, *McDavid Knee Guard, Inc.* v. *Nike USA, Inc.,* Civil No. 08-CV-6584, (Doc. No. 637), 3 pages.
Exhibit List Memorandum of Law in Support of Motion for Leave to File an Amended Answer by Nike USA, Inc., dated May 9, 2013, *McDavid Knee Guard, Inc.* v. *Nike USA, Inc.,* Civil No. 08-CV-6584, (Doc. No. 640), 1 page.
Exhibit 1-1 to Nike's Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 641), 14 pages.
Exhibit 9 to Memorandum of Law in Support of Motion for Leave to File Amended Answer dated May 9, 2013, *McDavid Knee Guard, Inc.* v. *Nike USA, Inc.,* Civil No. 08-CV-6584, (Doc. No. 642), 12 pages.
Exhibit 1-2 to Nike's Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 643), 4 pages.
Exhibit 1-3 to Nike's Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 644), 3 pages.
Exhibit 1-4 to Nike's Memorandum in Support of its Motion to Correct the Named Inventors of U.S. Reissue Patent No. 41,346 dated May 9, 2013, *McDavid Knee Guard, Inc.* v. *Nike USA, Inc.,* Civil No. 08-CV-6584, (Doc. No. 645), 5 pages.
Minute Entry Order dated May 14, 2013, *McDavid Knee Guard, Inc.* v. *Nike USA, Inc.,* Civil No. 08-CV-6584, (Doc. No. 646), 1 page.
Plaintiffs' Supplemental Briefing Pursuant to Aug. 1, 2013 Order dated Aug. 30, 2013, McDavid, Inc. v. Nike USA, Inc., Civil No. 08-cv-6584 (Doc. No. 739).
Supplemental Briefing on Laches by Defendant Nike USA, Inc. And Intervenor Marc Gibson Collinson in Support of Motion to Correct the Named Inventors of U.S. Reissue Patent Nos. 41,346, 42,689, 43,441, and 43,994 Pursuant to 35 U.S.C. § 256 dated Aug. 30, 2013, *McDavid, Inc.* v. *Nike USA, Inc.,* Civil No. 08-cv-6584 (Doc. No. 740).
Plaintiff McDavid's Complaint dated Feb. 11, 2013, *McDavid, Inc.* v. *Nike USA, Inc.,* Civil No. 1:13-cv-01137, (Doc. No. 1), 3 pages.
Plaintiff McDavid's Local Rule 3.4 Notice of Claims Involving Patent dated Feb. 11, 2013, *McDavid, Inc.* v. *Nike USA, Inc.,* Civil No. 1:13-cv-01137, (Doc. No. 4), 2 pages.
Plaintiff McDavid's Corporate Disclosure Statement Pursuant to F.R. C.P. 7.1 and L.R. 3.2 dated Feb. 11, 2013, *McDavid, Inc.* v. *Nike USA, Inc.,* Civil No. 1:13-cv-01137, (Doc. No. 5), 2 pages.
Plaintiff McDavid's First Amended Complaint dated Mar. 4, 2013, *McDavid, Inc.* v. *Nike USA, Inc.,* Civil No. 1:13-cv-01137, (Doc. No. 14), 18 pages.
Defendant Nike USA's Answer and Counterclaims to Plaintiffs' First Amended Complaint dated Apr. 3, 2013, *McDavid, Inc.* v. *Nike USA, Inc.,* Civil No. 1:13-cv-01137, (Doc. No. 22), 11 pages.
Defendant Nike USA's Federal Rule of Civil Procedure 7.1 Disclosure Statement and Local Rule 3.2 Notifications as to Affiliates dated Apr. 3, 2013, *McDavid, Inc.* v. *Nike USA, Inc.,* Civil No. 1:13-cv-01137, (Doc. 23), 3 pages.
Joint Status Report dated May 15, 2013, *McDavid, Inc.* v. *Nike USA, Inc.,* Civil No. 1:13-cv-01137, (Doc. 38), 11 pages.

(56) References Cited

OTHER PUBLICATIONS

Plaintiffs' Answer to Defendant Nike's Counterclaims in Answer to Plaintiffs' First Amended Complaint dated May 20, 2013, *McDavid, Inc.* v. *Nike USA, Inc.,* Civil No. 1:13-cv-01137, (Doc. No. 39), 7 pages.
Defendant Nike USA, Inc.'s Motion to Correct the Named Inventors of U.S. Reissue Patent No. 43,994 Pursuant to 35 U.S.C. § 256 dated May 30, 2013, *McDavid, Inc.* v. *Nike USA, Inc.,* Civil No. 1:13-cv-01137, (Doc. No. 46), 3 pages.
Defendant Nike USA, Inc.'s Notice of Motion to Correct the Named Inventors of U.S. Reissue Patent No. 43,994 Pursuant to 35 U.S.C. § 256 dated May 30, 2013, *McDavid, Inc.* v. *Nike USA, Inc.,* Civil No. 1:13-cv-01137, (Doc. No. 47), 3 pages.
Defendant Nike USA, Inc.'s Memorandum in Support of its Motion to Correct the Named Inventors of U.S. Reissue Patent No. 43,994 Pursuant to 35 U.S.C. § 256 dated May 30, 2013, *McDavid, Inc.* v. *Nike USA, Inc.,* Civil No. 1:13-cv-01137, (Doc. No. 48), 31 pages.
Defendant Nike USA, Inc.'s Motion for Leave to File an Amended Answer to Plaintiffs' First Amended Complaint dated May 30, 2013, *McDavid, Inc.* v. *Nike USA, Inc.,* Civil No. 1:13-cv-01137, (Doc. No. 49), 4 pages.
Notice of Defendant Nike USA, Inc.'s Motion for Leave to File an Amended Answer to Plaintiffs' First Amended Complaint dated May 30, 2013, *McDavid, Inc.* v. *Nike USA, Inc.,* Civil No. 1:13-cv-01137, (Doc. No. 50), 3 pages.
Defendant Nike USA, Inc.'s Memorandum of Law in Support of its Motion for Leave to File an Amended Answer dated May 30, 2013, *McDavid, Inc.* v. *Nike USA, Inc.,* Civil No. 1:13-cv-01137, (Doc. No. 51), 132 pages.
Marc G. Collinson's Motion to Intervene in this Action dated May 30, 2013, *McDavid, Inc.* v. *Nike USA, Inc.,* Civil No. 1:13-cv-01137, (Doc. No. 56), 2 pages.
Marc G. Collinson's Notice of Motion to Intervene in this Action dated May 30, 2013, *McDavid, Inc.* v. *Nike USA, Inc.,* Civil No. 1:13-cv-01137, (Doc. No. 57), 2 pages.
Memorandum in Support of Marc G. Collinson's Motion to Intervene in this Action dated May 30, 2013, *McDavid, Inc.* v. *Nike USA, Inc.,* Civil No. 1:13-cv-01137, (Doc. No. 58), 34 pages.
Marc G. Collinson's Motion (1) for Leave to File a Complaint in Intervention and (2) to Join Defendant Nike USA, Inc.'s Motion to Correct the Named Inventors of U.S. Reissue Patent No. RE43,994 Pursuant to 35 U.S.C. § 256 dated May 30, 2013, *McDavid, Inc.* v. *Nike USA, Inc.,* Civil No. 1:13-cv-01137, (Doc. No. 59), 8 pages.
Marc G. Collinson's Notice of Motion (1) for Leave to File a Complaint in Intervention and (2) to Join Defendant Nike USA, Inc.'s Motion to Correct the Named Inventors of U.S. Reissue Patent No. Re,43,994 Pursuant to 35 U.S.C. § 256 dated May 30, 2013, *McDavid, Inc.* v. *Nike USA, Inc.,* Civil No. 1:13-cv-01137, (Doc. No. 60), 3 pages.
Minute Entry Order dated Jun. 4, 2013, *McDavid, Inc.* v. *Nike USA, Inc.,* Civil No. 1:13-cv-01137, (Doc. No. 61), 1 page.
Order dated Jun. 14, 2013, *McDavid, Inc.* v. *Nike USA, Inc.,* Civil No. 1:13-cv-01137, (Doc. No. 72), 2 pages.
Order dated Jun. 14, 2013, *McDavid, Inc.* v. *Nike USA, Inc.,* Civil No. 1:13-cv-01137, (Doc. No. 73), 2 pages.
Marc G. Collinson's Complaint in Intervention dated Jun. 18, 2013, *McDavid, Inc.* v. *Nike USA, Inc.,* Civil No. 1:13-cv-01137, (Doc. No. 74), 4 pages.
Memorandum by Marc Gibson Collinson, Nike USA, Inc. In Support Of Its Motion To Correct The Named Inventors of U.S. Reissue Patent No. 43,994 Pursuant to 35 U.S.C. § 256, and exhibits 2 and 6 only, dated Aug. 9, 2013, *McDavid, Inc.* v. *Nike USA, Inc.,* Civil No. 1:13-cv-01137, (Doc. 75), 43 pages.
Memorandum by Nike USA, Inc. In Support of Its Motion For Leave To File An Amended Answer, and exhibits 1, 2, and 11 only, dated Aug. 9, 2013, *McDavid, Inc.* v. *Nike USA, Inc.,* Civil No. 1:13-cv-01137, (Doc. 76), 47 pages.
Order dated Jul. 29, 2013, *McDavid, Inc.* v. *Nike USA, Inc.,* Civil No. 08-cv-6584, (Doc. No. 715), 4 pages.
Submission of Additional Facts by McDavid, Inc., Stirling Mouldings Limited Plaintiffs' Submission of Additional Facts Regarding Application of Laches to Defendant Nike USA, Inc.'s and Mark G. Collinson's Motion to Correct the Named Inventors dated Aug. 1, 2013, *McDavid, Inc.* v. *Nike USA, Inc.,* Civil No. 08-cv-6584, (Doc. No. 716), 27 pages.
Response by Plaintiffs McDavid, Inc., Stirling Mouldings Limited (Public Version) Plaintiffs Opposition to Motions to Correct Named Inventors dated Aug. 9, 2013, *McDavid, Inc.* v. *Nike USA, Inc.,* Civil No. 08-cv-6584 (Doc. No. 719), 38 pages.
Memorandum in Support of Nike USA, Inc.'s Motion to Correct the Named Inventors of U.S. Reissue Patent No. 41,346 Pursuant to 35 U.S.C. 256 and exhibits dated Aug. 9, 2013, *McDavid, Inc.* v. *Nike USA, Inc.,* Civil No. 08-cv-6584 (Doc. No. 723), 99 pages.
Memorandum of Law in Support of Nike USA, Inc.'s Motion for Leave to File an Amended Answer dated Aug. 9, 2013, *McDavid, Inc.* v. *Nike USA, Inc.,* Civil No. 08-cv-6584 (Doc. No. 724), 159 pages.
Exhibit by Intervenor Marc Gibson Collinson, Defendant Nike USA, Inc. Corrected Exhibit 2 dated Aug. 9, 2013, *McDavid, Inc.* v. *Nike USA, Inc.,* Civil No. 08-cv-6584 (Doc. No. 725), 5 pages.
Response by Plaintiffs McDavid, Inc., Stirling Mouldings Limited to sealed document, 717 (Public Version) Plaintiffs' Response to Defendant Nike USA, Inc.'s and Intervenor Marc Gibson Collinson's Joint Statement of Disputed Facts and Additional Facts dated Aug. 9, 2013, *McDavid, Inc.* v. *Nike USA, Inc.,* Civil No. 08-cv-6584 (Doc. No. 727), 43 pages.
Reply by Intervenor Marc Gibson Collinson, Defendant Nike USA, Inc. Joint Reply In Support Of Motion To Correct The Named Inventors Of U.S. Reissue Patent Nos. 41,346, 42,689, 43,441, and 43,994, Pursuant To 35 U.S.C. § 256 dated Aug. 9, 2013, *McDavid, Inc.* v. *Nike USA, Inc.,* Civil No. 08-cv-6584 (Doc. No. 730), 35 pages.
Joint Statement by Marc Gibson Collinson, Nike USA, Inc. Of Disputed Facts And Additional Facts Regarding Defendant Nike USA, Inc.'s and Mark G. Collinson's Motion to Correct the Named Inventors dated Aug. 9, 2013, *McDavid, Inc.* v. *Nike USA, Inc.,* Civil No. 08-cv-6584 (Doc. No. 732), 21 pages.
Declaration of Charles M. McMahon In Support Of Joint Reply Of Defendant Nike USA, Inc. And Intervenor Marc Gibson Collinson In Support Of Motion To Correct The Named Inventors Of U.S. Reissue Patent Nos. 41,346, 42,689, 43,441, And 43,994, Pursuant To 35 U.S.C. § 256 and exhibits 6 and 19, dated Aug. 9, 2013, *McDavid, Inc.* v. *Nike USA, Inc.,* Civil No. 08-cv-6584 (Doc. No. 733), 15 pages.
Response by Marc Gibson Collinson, Nike USA, Inc. to Plaintiffs' Submission of Additional Facts Regarding Application of Laches and exhibit 10, dated Aug. 9, 2013, *McDavid, Inc.* v. *Nike USA, Inc.,* Civil No. 08-cv-6584 (Doc. No. 735), 22 pages.
Motion by Intervenor Mark Gibson Collinson for leave to file Complaint in Intervention and Join Defendant Nike USA, Inc.'s Motion to Correct the Named Inventors of U.S. Reissue Pat. No. RE41,346 dated May 16, 2013, *McDavid Knee Guard, Inc.* v. *Nike USA, Inc.,* Civil No. 08-CV-6584, (Doc. No. 653), 8 pages.
Notice of Motion by Charles McMahon for presentment of motion for leave to file Complaint in Intervention dated May 16, 2013, *McDavid Knee Guard, Inc.* v. *Nike USA, Inc.,* Civil No. 08-CV-6584, (Doc. No. 654), 4 pages.
Motion by Intervenor Mark Gibson Collinson to intervene dated May 16, 2013, *McDavid Knee Guard, Inc.* v. *Nike USA, Inc.,* Civil No. 08-CV-6584, (Doc. No. 655), 2 pages.
Notice of Motion by Charles McMahon for presentment of motion to intervene dated May 16, 2013, *McDavid Knee Guard, Inc.* v. *Nike USA, Inc.,* Civil No. 08-CV-6584, (Doc. No. 656), 2 pages.
Memorandum by Marc Gibson Collinson in support of motion to intervene dated May 16, 2013, *McDavid Knee Guard, Inc.* v. *Nike USA, Inc.,* Civil No. 08-CV-6584, (Doc. No. 657), 7 pages.
Declaration of Karl R. Fink regarding sealed document—Declaration of Karl R. Fink in support of Plaintiffs' Opposition to Nike's Motion to Exclude McGovern's Testimony Regarding Damages dated May 17, 2013, *McDavid Knee Guard, Inc.* v. *Nike USA, Inc.,* Civil No. 08-CV-6584, (Doc. No. 661), 3 pages.
Court's Request for Counsel's Input as to Conflict of Interest Issues dated May 20, 2013, *McDavid Knee Guard, Inc.* v. *Nike USA, Inc.,* Civil No. 08-CV-6584, (Doc. No. 668), 3 pages.

(56) References Cited

OTHER PUBLICATIONS

Minute Entry Order re Motion dated May 21, 2013, *McDavid Knee Guard, Inc.* v. *Nike USA, Inc.,* Civil No. 08-CV-6584, (Doc. No. 669), 1 page.
Minute Entry Order re Defendant's motion for leave to file an amended answer to plaintiffs' fourth amended complaint dated May 22, 2013, *McDavid Knee Guard, Inc.* v. *Nike USA, Inc.,* Civil No. 08-cv-6584, (Doc. No. 670), 1 page.
Intervenor Complaint filed by Mark Gibson Collinson dated May 22, 2013, *McDavid Knee Guard, Inc.* v. *Nike USA, Inc.,* Civil No. 08-cv-6584, (Doc. No. 671), 5 pages.
Plaintiffs' Motion for Reconsideration regarding Order on Sealed Motion dated May 30, 2013, *McDavid Knee Guard, Inc.* v. *Nike USA, Inc.,* Civil No. 08-cv-6584, (Doc. No. 674), 3 pages.
Plaintiffs' Memorandum in Support of Motion for Reconsideration dated May 30, 2013, *McDavid Knee Guard, Inc.* v. *Nike USA, Inc.,* Civil No. 08-cv-6584, (Doc. No. 676), 11 pages.
Notice of Motion by Karl Fink for Presentment of Motion for Reconsideration, Motion for Relief dated May 30, 2013, *McDavid Knee Guard, Inc.* v. *Nike USA, Inc.,* Civil No. 08-cv-6584, (Doc. No. 677), 2 pages.
Nike's Motion to Reassign Case dated May 30, 2013, *McDavid Knee Guard, Inc.* v. *Nike USA, Inc.,* Civil No. 08-cv-6584, (Doc. No. 678), 3 pages.
Notice of Motion by Charles McMahon for Presentment of Motion to Reassign Case dated May 30, 2013, *McDavid Knee Guard, Inc.* v. *Nike USA, Inc.,* Civil No. 08-cv-6584, (Doc. No. 679), 3 pages.
Memorandum by Nike USA, Inc. in Support of Motion to Reassign Case dated May 30, 2013, *McDavid Knee Guard, Inc.* v. *Nike USA, Inc.,* Civil No. 08-cv-6584, (Doc. No. 680), 13 pages.
Minute Entry Order dated May 31, 2013, *McDavid Knee Guard, Inc.* v. *Nike USA, Inc.,* Civil No. 08-cv-6584, (Doc. No. 681), 1 page.
Nike's Reply to Motion to Exclude all Testimony from Mr. McGovern dated May 31, 2013, *McDavid Knee Guard, Inc.* v. *Nike USA, Inc.,* Civil No. 08-cv-6584, (Doc. No. 682), 19 pages.
Minute Entry Order dated Jun. 6, 2013, *McDavid Knee Guard, Inc.* v. *Nike USA, Inc.,* Civil No. 08-CV-6584, (Doc. No. 684), 1 page.
Order dated Jun. 14, 2013, *McDavid Knee Guard, Inc.* v. *Nike USA, Inc.,* Civil No. 08-CV-6584, (Doc. No. 687), 2 pages.
McDavid's Answer to Intervenor Complaint Plaintiffs' Answer to Marc G. Collinson's Complaint in Intervention dated Jun. 17, 2013, *McDavid Knee Guard, Inc.* v. *Nike USA, Inc.,* Civil No. 08-CV-6584, (Doc. No. 688), 5 pages.
Nike USA's Memorandum in Support of Nike USA, Inc.'s Oral Motion to Correct the Named Inventor of U.S. Reissue Patent Nos. 42,689 and 43,441, *McDavid Knee Guard, Inc.* v. *Nike USA, Inc.,* Civil No. 08-CV-6584, (Doc. No. 689), 30 pages.
Declaration of Karl R. Fink in Support of Plaintiff's Opposition to Motions to Correct Named Inventors and Exhibits 3-4, 7-10, 12-13, dated Jun. 21, 2013, *McDavid Knee Guard, Inc.* v. *Nike USA, Inc.,* Civil No. 08-CV-6584, (Doc. No. 693), 3 pages.
Minute Entry Order dated Jun. 25, 2013, *McDavid Knee Guard, Inc.* v. *Nike USA, Inc.,* Civil No. 08-CV-6584, (Doc. No. 699), 1 page.
Declaration of Charles M. McMahon in Support of Joint Reply of Defendant Nike USA, Inc. and Intervenor Marc Gibson Collinson in Support of Motion to Correct the Named Inventors of U.S. Reissue Patent Nos. 41,346, 42,689, 43,441 and 43,994 Pursuant to 35 U.S.C. Section 256 dated Jul. 22, 2013, *McDavid Knee Guard, Inc.* v. *Nike USA, Inc.,* Civil No. 08-CV-6584, (Doc. No. 709), 5 pages.
Redacted Version of Reply by Interventor Marc Gibson Collinson and Nike USA, Inc.—Corrected Joint Reply of Defendant Nike USA, Inc. and Interventor Marc Gibson Collinson in Support of Motion to Correct the Named Inventors of U.S. Reissue Patent Nos. 41,346, 42,589, 43,441 and 43,994 Pursuant to 35 U.S.C. Section 256 dated Jul. 23, 2013, *McDavid Knee Guard, Inc.* v. *Nike USA, Inc.,* Civil No. 08-CV-6584, (Doc. No. 711), 35 pages.
Redacted Version of Deposition Transcript of Marc G. Collinson dated Jun. 5, 2013, *McDavid Knee Guard, Inc.* v. *Nike USA, Inc.,* Civil No. 08-CV-6584, 53 pages.
Redacted Version of Plaintiffs' Opposition to Motions to Correct Named Inventors, *McDavid Knee Guard, Inc.* v. *Nike USA, Inc.,* Civil No. 08-CV-6584, (Doc. No. 692), 38 pages.
Deposition Transcript of David Stirling Taylor dated Jul. 9, 2013, *McDavid Knee Guard, Inc.* v. *Nike USA, Inc.,* Civil No. 08-CV-6584, 296 pages.
Exhibit 11 entitled "Stirling Mouldings Limited's Responses and Objections to Defendant Nike USA, Inc.'s First Set of Interrogatories" dated Mar. 4, 2009, from the Declaration of Charles M. McMahon in Support of Joint Reply of Defendant Nike USA, Inc. and Intervenor Marc Gibson Collinson in Support of Motion to Correct the Named Inventors of U.S. Reissue Patent Nos. 41,346, 42,689, 43,441 and 43,994 Pursuant to 35 U.S.C. Section 256 dated Jul. 22, 2013, *McDavid Knee Guard, Inc.* v. *Nike USA, Inc.,* Civil No. 08-CV-6584, 11 pages.
Exhibit 12 entitled "McDavid Knee Guard, Inc.'s Responses and Objections to Defendant Nike's First Set of Interrogatories" dated Mar. 4, 2009, from the Declaration of Charles M. McMahon in Support of Joint Reply of Defendant Nike USA, Inc. and Intervenor Marc Gibson Collinson in Support of Motion to Correct the Named Inventors of U.S. Reissue Patent Nos. 41,346, 42,689, 43,441 and 43,994 Pursuant to 35 U.S.C. Section 256 dated Jul. 22, 2013, *McDavid Knee Guard, Inc.* v. *Nike USA, Inc.,* Civil No. 08-CV-6584, 11 pages.
Exhibit 13 entitled "Stirling Mouldings Limited's Supplemental Responses and Objections to Defendant Nike USA, Inc.'s First Set of Interrogatories" dated Apr. 10, 2009, from the Declaration of Charles M. McMahon in Support of Joint Reply of Defendant Nike USA, Inc. and Intervenor Marc Gibson Collinson in Support of Motion to Correct the Named Inventors of U.S. Reissue Patent Nos. 41,346, 42,689, 43,441 and 43,994 Pursuant to 35 U.S.C. Section 256 dated Jul. 22, 2013, *McDavid Knee Guard, Inc.* v. *Nike USA, Inc.,* Civil No. 08-CV-6584, 5 pages.
Exhibit 12 entitled "Supplemental Invalidity Contentions" dated Sep. 24, 2010 from Declaration of Karl R. Fink in Support of Plaintiff's Opposition to Motions to Correct Named Inventors dated Jun. 21, 2013, *McDavid Knee Guard, Inc.* v. *Nike USA, Inc.,* Civil No. 08-CV-6584, 17 pages.
Plaintiffs' Response to Memorandum dated Nov. 12, 2013, *McDavid, Inc.* v. *Nike USA, Inc.*, Civil No. 08-cv-6584 (Dkt No. 768).
Response by Intervenor Marc Gibson Collinson, Defendant Nike USA, Inc. to Supplement on Laches in Support of Motion to Correct the Named Inventors of U.S. Reissue Patent Nos. 41,346, 42,689, 43,441, and 43,994 Pursuant to 35 U.S.C. 256 (Dkt. No. 769).
Declaration of Haskell Beckham, Ph.D. dated Feb. 11, 2014 from the Petition for Inter Partes Review of Patent No. RE43,994 (Exhibit 1001) (815 pages).
Petition for Inter Partes Review of Claims 15, 17, 21, 22, 27, 28, 30-33, 35, 38, 39 and 43 of U.S. Patent No. RE43,994 dated Feb. 11, 2014 (65 pages) (*Nike USA, Inc.* v. *Stirling Mouldings Limited*).

FLEXIBLE MATERIAL

Matter enclosed in heavy brackets [ ] appears in the original patent but forms no part of this reissue specification; matter printed in italics indicates the additions made by reissue.

*Notice: multiple reissue applications have been filed for the reissue of U.S. Pat. No. 6,743,325. This application is a continuation reissue application of 13/107,688, filed on May 13, 2011 now U.S. Pat. No. Re. 43,441, which is a continuation reissue application of 12/642,522, filed on Dec. 18, 2009, now U.S. Pat. No. Re. 42,689, which is a continuation reissue application of 11/269,919, filed on Nov. 8, 2005, now U.S. Pat. No. Re. 41,346, which is a reissue application of U.S. Pat. No. 6,743,325, filed as application Ser. No. 10/030,782 on Apr. 23, 2002, which claims priority to PCT/GB00/02687 filed Jul. 13, 2000; GB99/16291.9 filed Jul. 13, 1999; and GB 99/21804.2 filed Sep. 16, 1999; all of which are hereby fully incorporated by reference as if fully set forth herein. In addition to the above applications, the following also are all reissue applications of U.S. Pat. No. 6,743,325 and continuation reissue applications of reissue application Ser. No. 11/269,919, filed Nov. 8, 2005: reissue application Ser. No. 12/642,550, filed on Dec. 18, 2009; and application Ser. No. 13/737,408, filed on Jan. 9, 2013.*

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a method of manufacturing a flexible material suitable, primarily, for use as a flexible protective material to protect for human and animal bodies.

BACKGROUND OF THE INVENTION

Protective material and protective wear is currently used by persons to protect themselves from knocks, abrasions and other injury. Protective wear is used during sport, rugby for example and equestrian sports and other activities where a person runs a risk of injury, for example building and other trades.

Conventional protective wear may form an integral part of an item of clothing, for example a shoulder pad, or be provided separately, for example a shin pad.

One existing arrangement comprises a moulded foam article shaped to fit a particular part of the body. There are, however, a number of problems with this arrangement. The article must be produced in different sizes to fit different people. Provision of different sizes can be expensive or inconvenient. Also, closely fitting articles can restrict movement of the wearer, especially when worn on or near joints.

In DE 43 41 722 is disclosed a cushioning material for the treatment of lymphostatic fibroses in which a plurality of foam elements with an enlarged base are disposed side-by-side with their bases touching on a foundation layer to which they are affixed. The troughs defined between the side walls of the elements enable the material to be flexed to form a pressure bandage. However, the foram elements of the bandage touch one another at their base, which restricts the stretchability of the material as a whole and is also designed to be worn with the elements in contact with the skin, which would restrict movement.

A moulded foam article can only correctly fit a joint when in one position. When the joint moves, the article will no longer fit correctly. This may reduce the protection it affords.

In U.S. Pat. No. 3,285,768 is disclosed a fabric coated with a surface deformed foam which is manufactured either by grooving or slashing a sheet of foam to a portion of its depth and then laminating it to the fabric or by laminating a foam sheet to a fabric and then grooving or slashing the form layer. However, neither of these methods enables the foam to be cut to define a plurality of spaced, separate elements, which is preferred if the fabric is to be used in protective wear for ,sports persons when considerable freedom of movement by the wearer is required in addition to comfort.

Another existing arrangement comprises a quilted material including lengths of foam sewn into pockets formed between two layers of fabric. Such materials are time consuming to produce. Also, such materials can generally only easily be flexed in a direction perpendicular to that of the strips of foam. Flexing the material in a direction along the length of the strips involves flexing the strips themselves which, depending on the type of foam used, can be difficult. A similar type of garment is disclosed in U.S. Pat. No. 5,551,082 which describes an athletic garment in which strategically placed rib-shaped gel, air or foam padding is contained in envelopes that are individually affixed to an elasticized fabric shell.

BRIEF SUMMARY OF THE INVENTION

It is an object of the present invention to overcome, or at least reduce, the problems associated with the manufacture of conventional protective material and with protective wear made therefrom.

According to a first aspect of the present invention there is provided a method of manufacturing a flexible material comprising the steps of providing a sheet of a resilient material; cutting the sheet into a plurality of spaced, separate elements using a cutter which is pressed into the sheet to cut therethrough; making one side of the spaced elements to stand proud of the surface of a jig provided to hold the elements in place; and bonding a flexible, resiliently stretchable substrate to one side of the separate elements by heating the substrate either to active an adhesive applied between said one side of the separate elements and the substrate or to weld the elements to the substrate.

The separate elements are preferably bonded to the substrate with a hot melt adhesive, although they can be welded thereto using heat to fuse the elements to the substrate.

According to a second aspect of the present invention there is provided a flexible material comprising a layer of separate resilient elements joined to a flexible, resiliently stretchable substrate and manufactured according to the method of the first aspect of the present invention.

Such a flexible material can confirm more easily to the body of the wearer than conventional materials, as it is flexible in all three dimensions. It is therefore more comfortable to wear and can accommodate movement better than conventional materials. When used as a protective material or to form protective wear a single size, or a reduced number of sizes, can fit many different sized bodies.

As the elements are separate and spaced apart; this facilitates flexing of the substrate to form a curved surface and enables the material to flex in all directions without "locking up" or preventing movement in a particular direction. This is a particular advantage the flexible material of the present invention has over prior art arrangements which tend not to exhibit universal flexibility.

The elements preferably comprise a resilient foam material, for example a closed cell polyethylene, and could comprise a number of different types of foam or other materials to give desired properties, for example layers of foam of different densities.

The elements may be substantially identical, alternatively they can be of different size and shape, for example to fit comfortably part of a wearer's body, or some other article.

The elements preferably take the form of blocks. They can be of regular or irregular shape, for example hexagonal or octagonal in cross-section. The elements are preferably evenly distributed on the substrate with a density of between 100 and 8000 elements/$m^2$, more preferably between 250 and 8000 elements/$m^2$, and still more preferably between 4000 and 6000 elements/$m^2$. In one embodiment, the elements comprise cubes of side 12 mm spaced apart by 2 mm. This gives a density of about 5000 cubes/$m^2$. This allows the material to flex easily along all directions, an improvement over known quilted protective materials. Also, one type of material can be cut to many different sizes, for example to form protective wear of different sizes, without significantly affecting its ability to flex. This is in contrast to known quilted protective materials wherein due to the size of the foam strips, the size of each strip must be changed to form an article of different size without reducing flexibility.

The substrate is resiliently stretchable or elastic and preferably comprises a fabric, although a resiliently stretchable film or sheet could be used. This enables the material to adopt a greater range of configurations. Suitable fabrics include knitted nylon and polyester fabrics and more particularly those materials comprising elastane.

A second layer of a flexible substrate material is preferably bonded over the elements so that they are sandwiched between two layers. In this case, as the first substrate layer is resiliently stretchable or elastic, this helps to prevent puckering of one side of the material when it is flexed. Advantageously, both substrate layers are resiliently stretchable. However, in cases where only a single stretchable substrate layer is provided and the material is to be used in a curved configuration the material is preferably arranged so that the stretchable layer lies on the outside surface of the curve.

The material may be comprised in clothing or other wear. It is particularly suitable for incorporation into protective clothing and wear, for example shoulder pads, knee pads, shin pads, arm bands, head-guards, vests and gauntlets for both humans and animals. It will be appreciated that in these garments the blocks are provided where required and omitted from certain areas of the garment. For example, in a head-guard no blocks need be positioned in the ear-flaps of the guard.

The material could also be comprised in furniture or upholstery and can be particularly useful when used with wheelchairs and hospital beds. Spaced part elements can help to reduce the incidence of bed sores. As the material is resilient, it comprises a cushioning medium, for,; example for saddles. Where the material comprises a foam layer, this provides it with good thermally insulating properties and it can be usefully incorporated into, or used to form wet suits. A foam layer can also render the material buoyant in water, in which case it can be usefully used in or to form buoyancy vests, life jackets and swimming aids. When used as a swimming aid, for example, the material can be incorporated in swimming costumes as an aid to the buoyancy of the wearer. It is possible in this case to arrange for the foam blocks to be progressively removable from the costume as the confidence and skill or the trainee swimmer increases.

The material may also be used for packaging and cladding.

As indicated above, the elements may not be distributed all over the surface of the substrate. In particular, there may be a border of substrate having no element thereon. The border may include a fastening means, for example VELCRO(™) to enable it to be affixed to itself or to another article, say a garment.

In one embodiment, the elements could comprise a series of spaced-apart strips. Such a material would have different properties when flexed in different directions.

Preferably, at least said one side of the elements are coated with the hot-melt adhesive prior to being cut into the separate elements. Alternatively or in addition, the side of the substrate adjacent said one side of the elements is coated with the hot-melt adhesive. A sheet of hot-melt film may also be interposed between said one side of the elements and the substrate to provide said adhesive layer.

Advantageously, the resilient sheet is cut into a plurality of separate elements using a cutter which acts as the jig after cutting through the resilient material to hold the elements in place while the substrate layer is applied thereto. Preferably, the cutter is adapted so that said one side of each, now cut, element are made to stand proud of the surface of the cutter grid. The sheet material may spring back slightly after cutting to accomplish this. Alternatively, means, such as ejectors, are provided to achieve this effect.

In one embodiment of the method, a sheet of a resilient material is provided and at least one side of the sheet is coated with a hot melt adhesive. The sheet is placed, adhesive side up, over a cutter grid arranged to cut the sheet into a plurality of elements, for example squares. The sheet is pressed down onto the cutter to cut through the sheet. Excess material from between the elements is then removed. A resiliently stretchable substrate is placed over the, now cut, sheet and heated to activate the adhesive to join the elements to the substrate. The substrate is then lifted away from the cutter, taking the elements with it.

It will be appreciated that in this embodiment, the cutter grid acts as a jig, holding the elements in placed while the substrate layer is applied. If the flexible material is to be cut into large pieces, in particular large irregularly shaped pieces, then these pieces may be assembled into a specially constructed jig to hold them into place before application of the substrate. Conveniently, as before the sheet of resilient material from which the elements are cut has an adhesive layer applied to one or both surfaces prior to the cutting process.

Alternatively, the sheet of resilient material is cut into strips in a first direction using a plurality of rolling cutters and then cut in a second direction at an angle to the first direction to the separate elements. Preferably, the rolling cutters are moved sideways after each cut to cut narrow strips of material in both directions to space the elements apart, the narrow strips of material being removed to leave the separate elements spaced apart from one another.

BRIEF DESCRIPTION OF THE SEVERAL VIEWS OF THE DRAWINGS

Embodiments of the various aspects of the invention will now be described by way of example with reference to the accompanying drawings.

DETAILED DESCRIPTION OF THE INVENTION

Figure 1:
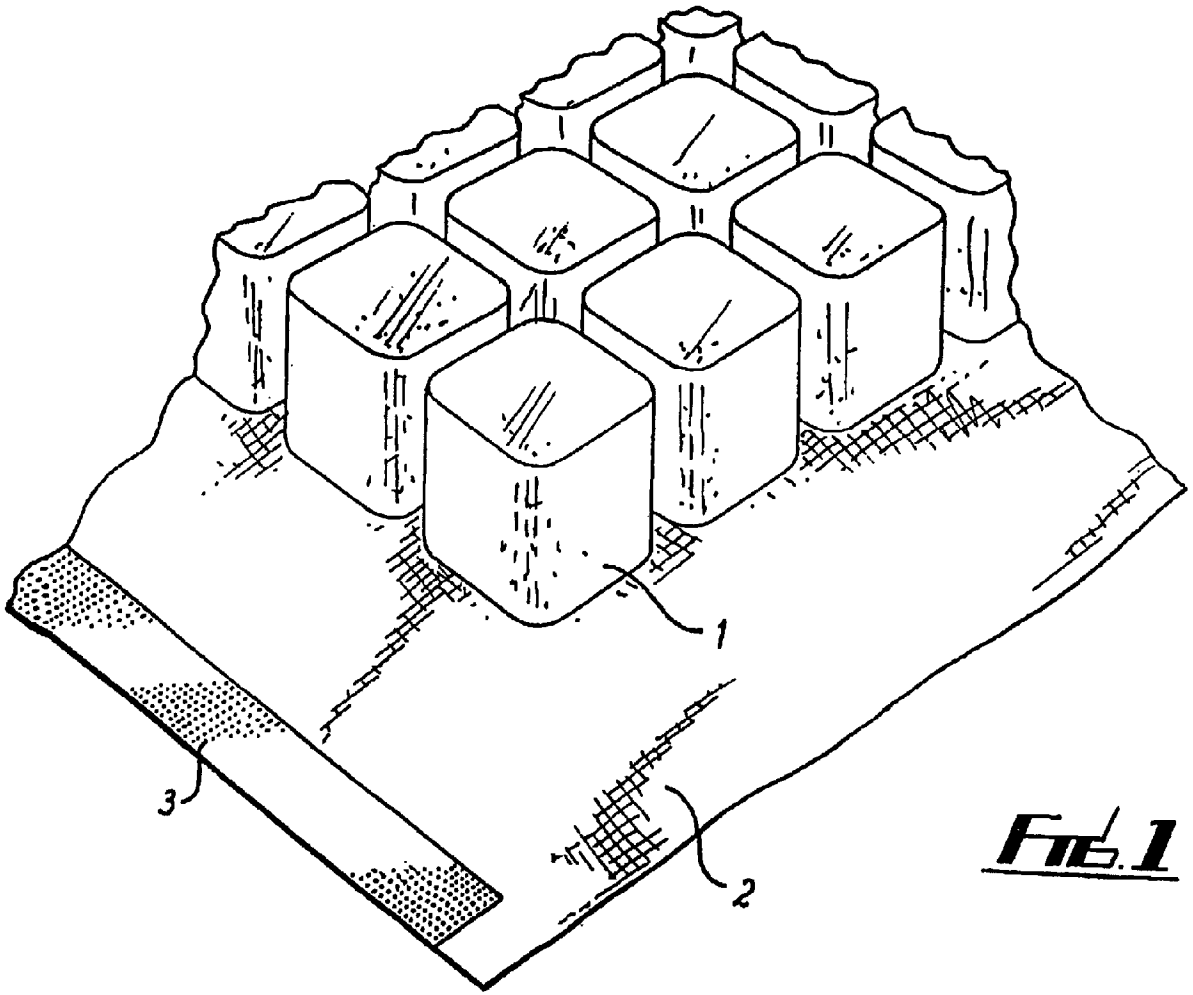
FIG. 1 is an enlarged perspective view of part piece of flexible material according to the invention.

Referring to FIG. 1, a flexible material comprises a plurality of cubes 1 of a resilient closed-cell polyethylene foam, of side approximately 12 mm and with corners of radius approximately 2.5 mm, joined with a hot melt adhesive to a fabric substrate 2. The cubes 1 are evenly arranged, each cube being spaced from adjacent cubes by approximately 2 mm. The fabric 2 is a resiliently stretchable knitted fabric, preferably one comprising polyester or elastane fibers.

A margin of fabric 2 is provided around the periphery of the cubes 1. Along the edges of the fabric at opposite ends respectively there are strips 3 of VELCRO(™), only one of which is shown.

Figure 2:
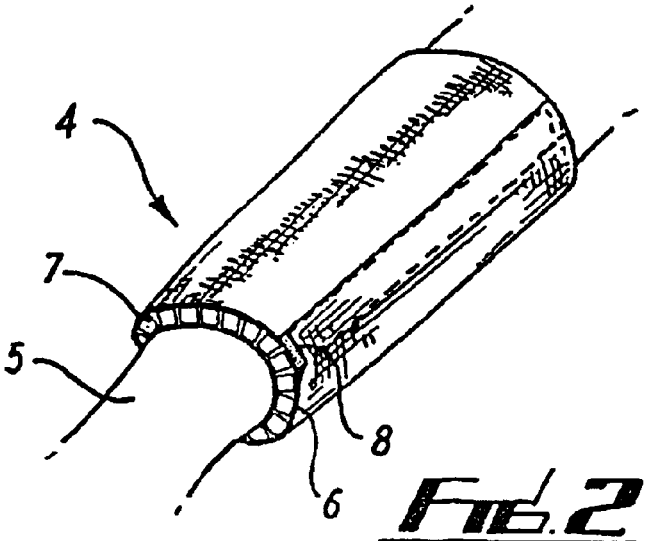
FIG. 2 shows a schematic view of a protective arm band formed from the type of material of FIG. 1.

Referring to FIG. 2, a protective armband 4 is shown being worn on part of an arm 5. The armband 4 is formed from a generally rectangular piece of material of the type shown in FIG. 1 but which in this case comprises a fabric substrate 6 bonded to both sides thereof with a plurality of foam cubes 7 sandwiched therebetween. Margins are provided at opposite ends respectively of the substrate 6 and a strip of VELCRO (™) 8 is fastened on this margin to enable opposite ends of the material to be fastened in an overlaying relationship to form a tube. By varying the degree of overlap of the ends, the tube can be closely fitted around arms of different sizes. The provision of a substrate layer 6 on both sides of the cubes 7 prevents the latter from separating too much as the material is curved around to form a tube. Rather, the substrate 6 on the outside of the armband is forced to stretch and the edges of the cubes 7 at the inner side of the armband are compressed. The provision of a substrate layer on both sides of the material therefore enables the material to continue to provide good protection, even when tightly flexed.

Figure 3:
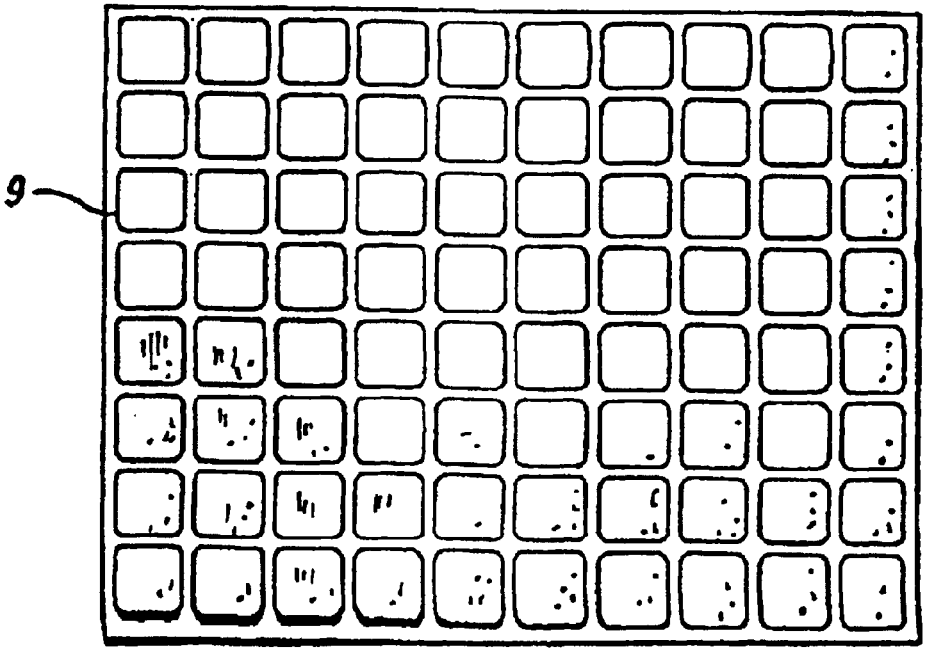
FIG. 3 is a plan view of a cutter grid.

FIG. 3 shows a plan view of a cutter used for manufacturing the material of FIG. 1. The cutter comprises blades defining a plurality of squares of 12 mm side with corners of radius 2.5 mm.

Figure 4:
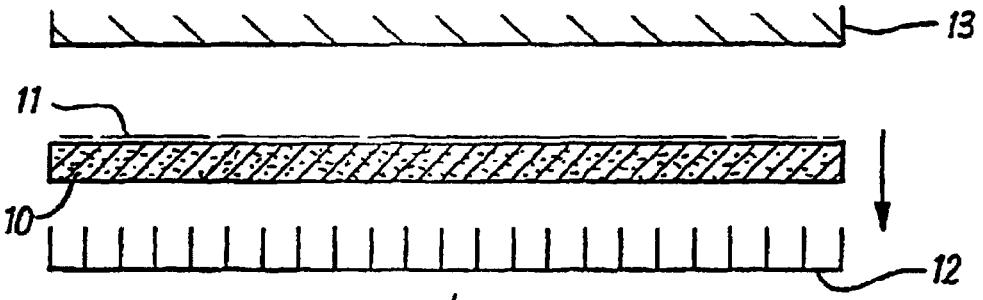
FIGS. 4 to 6 are vertical cross-sectional views of apparatus used in the manufacture of material as shown in FIG. 1 at various stages respectively throughout the manufacturing process.
Figure 5:
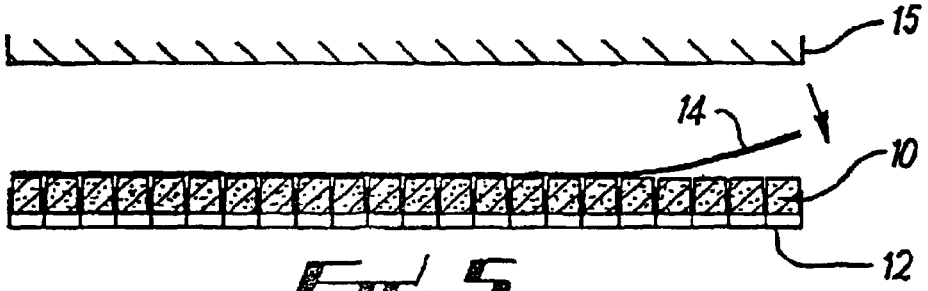
Figure 6:
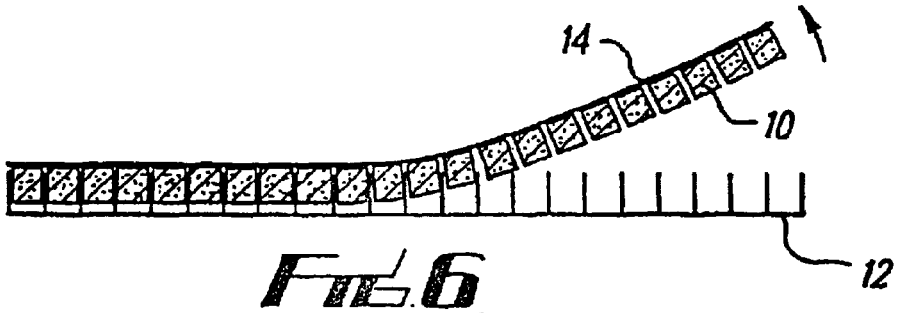

FIGS. 4 to 6 are vertical cross-sectional views of apparatus at various stages respectively throughout the manufacture of the flexible material shown in FIG. 1. Referring to these figures, one side of a 12 mm thick layer of closed cell polyethylene foam 10 is coated with a hot melt adhesive 11. The foam 10 is then placed onto a cutter 12, of the type shown in FIG. 3, and pressed down with a press 13 so that the cutter 12 cuts through the foam 10 to form a plurality of separate cubes. The press is then removed, whereupon owing to its resilient nature, the foam will tend to spring back slightly so that the exposed surface of each cube stands proud to lie above the surface of the cutter. Excess material from between the elements is then removed.

Next, as shown in FIG. 5, a layer of fabric is placed over the foam and cutter 12 and a heated platen 15 is brought into contact with the fabric 14. Heat is conducted through the fabric 14 to the foam and activates the adhesive, bonding the fabric 14 to the foam 10. In this arrangement, the cutter grid acts as a jig, holding the foam cubes in position whilst the fabric substrate 14 is applied thereto.

Then, as shown in FIG. 6, the fabric can be lifted away from the cutter taking the foam cubes 10 with it.

In an alternative method, ejectors are disposed in the cutter grid to eject the elements, leaving any waste material behind in the cutters.

If the foam 10 is to be cut into large pieces, in particular large irregularly shaped pieces such as may be suitable for use in an equestrian jacket, then these pieces may be assembled into a specially constructed jig to hold them into place before application of the fabric substrate 14. As described above, the sheet of resilient foam from which the elements are cut will have hot-melt adhesive applied to one or both surfaces prior to the cutting process.

In a further variation, the sheet of resilient material is cut into strips in a first direction using a plurality of rolling cutters. The sheet is cut in a second direction perpendicular to the first to form cubes. The cutters are then moved sideways to cut narrow strips of foam in both directions to space the cubes apart, the narrow strips of foam being stripped away to leave the cubes.

Figure 7:
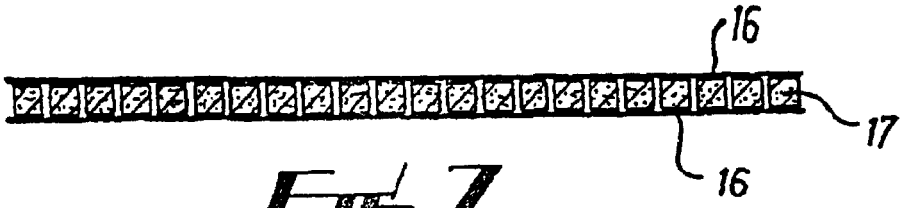
FIG. 7 is a cross-sectional view through another embodiment of a flexible material according to the invention.

FIG. 7 shows another embodiment of flexible material similar to that shown in FIG. 1, but with a layer of fabric 16 bonded to each of opposite sides of tho elements 17. This embodiment may be produced in a similar way to that shown in FIG. 1 except that opposite sides of the foam layer are coated with adhesive and, after the foam cubes bonded to a first layer of fabric have been removed from the cutter, a second layer of fabric is placed over the exposed surface of the elements and pressed with a heated platen to effect a bond.

In other variations to the above methods, the hot-melt adhesive may be applied to the surface the substrate rather or in addition to the sides of the flexible material. Alternatively or in addition, a hot-melt film can be interposed between the elements and the substrate.

Also, heated nip-rollers can be used in place of a heated platen to bond the elements to the substrate, particularly when substrate is bonded to both sides of the elements, which are thereby sandwiched therebetween. This facilitates passage of the material between the rollers prior to activation of the adhesive.

Flexible materials according to the invention are more convenient to produce and more flexible and versatile that known protective materials. They may also be used in a variety of applications including protective wear and clothing.

I claim:

[1. A method of manufacturing a flexible material comprising the steps of providing a sheet of a resilient material;

cutting the sheet into a plurality of spaced separate elements using a cutter which is pressed into the sheet to cut therethrough;

making one side of the plurality of spaced separate elements to stand proud of a surface of a jig provided to hold the elements in place; and bonding a flexible resiliently stretchable substrate to one side of the separate elements by heating the substrate either to activate an adhesive applied between said one side of the separate elements and the substrate or to weld the separate elements to the substrate.]

[2. The method as claimed in claim 1 wherein the sheet is cut into a plurality of separate elements using a cutter which acts as the jig after cutting through the resilient material to hold the elements in place while the substrate is applied thereto.]

[3. The method as claimed in claim 2, wherein the cutter is adapted so that said one side of each of the cut elements is made to stand proud of a surface of the cutter after cutting through said sheet of resilient material.]

[4. The method as claimed in claim 3, wherein any excess resilient material located between the plurality of spaced separate elements is retained in the cutter.]

[5. The method as claimed in claim 3, wherein any excess resilient material is removed from between the plurality of spaced separate elements prior to the elements being bonded to the substrate.]

[6. The method as claimed in any of claim 1, wherein the plurality of spaced separate elements comprise a foam material.]

[7. The method as claimed in claim 1, further comprising: bonding a second flexible substrate to an opposite side of the plurality of spaced separate elements to said one side.]

[8. The method as claimed in claim 1, wherein at least said one side of the sheet is coated with a hot-melt adhesive prior to being cut into the plurality of spaced separate elements.]

[9. The method as claimed in claim 1, wherein the side of the substrate adjacent said one side of the plurality of spaced separate elements is coated with a hot-melt adhesive.]

[10. The method as claimed in claim 1, wherein a sheet of hot-melt film is interposed between said one side of the plurality of spaced separate elements and the substrate so as to provide said adhesive.]

[11. The method as claimed in claim 1, wherein the sheet of resilient material is cut into strips in a first direction using a plurality of rolling cutters and then cut in a second direction at an angle to the first direction to form the plurality of spaced separate elements.]

[12. The method as claimed in claim 11 wherein the rolling cutters are moved sideways after each cut to cut narrow strips of material in both directions to space the elements apart, the narrow strips of material being removed to leave the plurality of spaced separate elements spaced from one another.]

[13. The method as claimed in claim 1 wherein the substrate is heated by a heated platen which either activates the adhesive or melts the surface and thereby bonds the substrate and the plurality of spaced separate elements together.]

[14. The method as claimed claim 10, wherein the substrate is heated by passing the substrate and the adjacent plurality of spaced separate elements between heated nip rollers.]

*15. A method of manufacturing a flexible resiliently compressible material, the method comprising:*

*cutting a sheet of resiliently compressible foam with a cutter that goes completely through the foam to provide a plurality of separate individual resiliently compressible elements in a spaced apart relationship, the separate elements having a first surface and second surface;*

*bonding the first surfaces of the plurality of separate individual compressible elements to a first resiliently stretchable fabric substrate while adjacent separate individual elements are held by a grid in a spaced apart relation with about 2 mm between the adjacent elements, the bonding selected from the group consisting of adhesively bonding and welding; and*

*bonding the second surfaces of the plurality of separate individual compressible elements to a second resiliently stretchable fabric substrate while adjacent separate individual elements are in a spaced apart relation with about 2 mm between the adjacent elements, the bonding selected from the group consisting of adhesively bonding and welding, to provide the flexible resiliently compressible material with the plurality of separate resiliently compressible elements being distributed between the substrates at a density of from about 250 to about 8000 elements/$m^2$, and the first and second substrates not bonded to each other between the adjacent elements.*

*16. The method according to claim 15 wherein the elements are distributed between the substrates at a density of from about 4000 to about 8000 elements/$m^2$.*

*17. The method according to claim 15 wherein the first and second surfaces of the elements are flat.*

*18. The method according to claim 17 wherein the elements are distributed between the substrates at a density of from about 4000 to about 6000 elements/$m^2$.*

*19. The method according to claim 15 wherein the elements are comprised of layers of foam having different densities.*

*20. The method according to claim 19 wherein the elements are distributed between the substrates at a density of from about 4000 to about 6000 elements/$m^2$.*

*21. The method according to claim 15 wherein the elements are comprised of polyethylene foam.*

*22. A method of manufacturing a flexible resiliently compressible material, the method comprising:*

*applying adhesive to a surface of a sheet of resiliently compressible foam;*

*cutting a sheet of resiliently compressible foam with the adhesive thereon with a cutter that goes completely through the foam and adhesive to provide separate individual resiliently compressible elements, the separate individual elements having a surface with adhesive thereon and an opposite surface which is opposite to the surface with the adhesive;*

*bonding the surfaces of the separate compressible elements with the adhesive thereon to a first resiliently stretchable fabric substrate while holding the compressible elements with a jig in spaced apart relation with about 2 mm between the elements, the bonding selected from the group consisting of adhesively bonding and welding; and*

*bonding the opposite surfaces of the separate compressible elements to a second resiliently stretchable fabric substrate, the separate elements in spaced relation to each other and the fabric substrates not bonded to each other between the separate elements to provide the flexible resiliently compressible material, the elements being distributed between the substrates at a density of from about 250 to about 8000 elements/$m^2$.*

*23. The method according to claim 22 wherein the elements are distributed between the substrates at a density of from about 4000 to about 8000 elements/$m^2$.*

*24. The method according to claim 22 wherein the surfaces and opposite surfaces of the elements are flat.*

*25. The method according to claim 24 wherein the elements are distributed between the substrates at a density of from about 4000 to about 6000 elements/$m^2$.*

*26. The method according to claim 22 wherein the elements are comprised of layers of foam having different densities.*

*27. The method according to claim 26 wherein the elements are distributed between the substrates at a density of from about 4000 to about 6000 elements/$m^2$.*

*28. The method according to claim 26 wherein the surfaces and opposite surfaces of the elements are flat.*

*29. The method according to claim 22 wherein the elements are comprised of polyethylene foam.*

*30. A method of manufacturing a flexible resiliently compressible material, the method comprising:*

*cutting a sheet of resiliently compressible foam with a cutter that goes completely through the foam to provide*

*separate individual resiliently compressible elements, the separate individual elements having a first surface and second surface;*

*bonding the first surfaces of the separate individual compressible elements to a first resiliently stretchable fabric substrate while holding the elements with a jig so that there is about 2 mm between side walls of the elements, the bonding selected from the group consisting of adhesively bonding and welding; and*

*bonding the second surfaces of the separate resiliently compressible elements to a second resiliently stretchable fabric substrate to provide the resiliently compressible material, the fabric substrates not bonded to each other between the separate elements, the separate elements being distributed between the substrates at a density of from about 250 to about 8000 elements/m$^2$.*

*31. The method according to claim 30 wherein the separate elements are distributed between the substrates at a density of from about 4000 to about 6000 elements/m$^2$.*

*32. The method according to claim 31 wherein the first and second surfaces of the separate elements are flat.*

*33. The method according to claim 32 wherein the separate elements are comprised of layers of foam having different densities.*

*34. The method according to claim 30 wherein the first and second surfaces of the separate elements are flat.*

*35. The method according to claim 34 wherein the separate elements are comprised of layers of foam having different densities.*

*36. The method of claim 35 wherein the layers of foam having different densities are closed cell foam.*

*37. The method according to claim 30 wherein the separate elements are comprised of layers of foam having different densities.*

*38. The method according to claim 30 wherein the separate elements are comprised of closed cell foam.*

*39. The method according to claim 30 wherein the separate elements are comprised of polyethylene foam.*

*40. A method of manufacturing a flexible resiliently compressible material, the method comprising:*

*cutting a sheet of resiliently compressible foam with a cutter that goes completely through the foam to provide a plurality of separate individual resiliently compressible elements, the separate individual elements having a first surface and a second surface;*

*bonding one of the first or second surfaces of the separate individual resiliently compressible elements to a first resiliently stretchable fabric substrate while the elements are held by a jig and adjacent elements are about 2 mm apart and the elements are at a density of from about 250 to about 8000 elements/m$^2$ to provide a fabric/element combination; and*

*bonding a second fabric substrate to the elements of the fabric/element combination to provide the resiliently compressible material, the bonding selected from the group consisting of adhesively bonding and welding, the fabric substrates of the resiliently compressible material not bonded to each other between the separate elements and with the elements being distributed between the substrates at a density of from about 250 to about 8000 elements/m$^2$.*

*41. The method according to claim 40 wherein the separate elements are comprised of closed cell foam.*

*42. The method of claim 41 wherein the elements are comprised of layers of foam having different densities.*

*43. A method of manufacturing a flexible resiliently compressible material, the method comprising:*

*providing a first resiliently stretchable fabric substrate;*

*cutting a sheet of resiliently compressible foam with a cutting grid that goes completely through the foam to provide separate individual resiliently compressible, elements having top surfaces and bottom surface which are flat;*

*providing a second resiliently stretchable fabric substrate;*

*bonding the top surfaces of the resiliently compressible elements to the first resiliently stretchable fabric substrate while adjacent elements are held by a jig so that a distance between the sidewalls of adjacent elements is about 2 mm, the bonding selected from the group consisting of adhesively bonding and welding; and*

*bonding the bottom surfaces of the resiliently compressible elements to the second resiliently stretchable fabric substrate while the sidewalls of adjacent elements are at a distance of about 2 mm, the bonding selected from the group consisting of adhesively bonding and welding, to provide the resiliently compressible material with the fabric substrates not bonded to each other between adjacent individual elements and to provide the flexible resiliently compressible material with the individual resiliently compressible elements being distributed between the substrates at a density of from about 250 to about 8000 elements/m$^2$.*

* * * * *